United States Patent
Takebayashi et al.

(10) Patent No.: US 11,992,951 B2
(45) Date of Patent: May 28, 2024

(54) CONTROL METHOD, CONTROL DEVICE, ROBOT SYSTEM, PROGRAM, AND RECORDING MEDIUM

(71) Applicant: Kawasaki Jukogyo Kabushiki Kaisha, Kobe (JP)

(72) Inventors: Jun Takebayashi, Kobe (JP); Toshihiko Miyazaki, Kobe (JP); Yusuke Fujimoto, Kobe (JP); Masaya Yoshida, Kobe (JP); Atsushi Kameyama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 262 days.

(21) Appl. No.: 17/767,058

(22) PCT Filed: Oct. 7, 2020

(86) PCT No.: PCT/JP2020/037981
§ 371 (c)(1),
(2) Date: Apr. 7, 2022

(87) PCT Pub. No.: WO2021/070859
PCT Pub. Date: Apr. 15, 2021

(65) Prior Publication Data
US 2022/0379472 A1    Dec. 1, 2022

(30) Foreign Application Priority Data
Oct. 9, 2019    (JP) ................... 2019-186009

(51) Int. Cl.
*B25J 9/00*    (2006.01)
*B25J 9/16*    (2006.01)

(52) U.S. Cl.
CPC ................... *B25J 9/1664* (2013.01)

(58) Field of Classification Search
CPC . B25J 9/1664; B25J 9/10; G05B 2219/50042; G05B 19/42
See application file for complete search history.

(56) References Cited

U.S. PATENT DOCUMENTS

| | | | |
|---|---|---|---|
| 7,865,269 B2* | 1/2011 | Prisco | A61B 34/75 414/2 |
| 8,116,908 B2* | 2/2012 | Ng-Thow-Hing | B25J 9/1664 700/245 |

(Continued)

FOREIGN PATENT DOCUMENTS

JP    7-28520 A    1/1995

*Primary Examiner* — Ian Jen
(74) *Attorney, Agent, or Firm* — XSENSUS LLP

(57) ABSTRACT

A control method includes: recording information of an operation target point that is a destination, each time an end effector of a robot moves to the operation target point on an operation path; acquiring a present position of the end effector upon receiving an origin return command; detecting information of a return target point on a return path for returning the end effector to an origin; detecting information of the operation target point already reached immediately before a kth return target point or having a distance closest to the kth return target point, as a (k+1)th return target point; repeating detection of the information of the return target point to detect information of second to (n+1)th return target points; and moving the end effector along the return path passing through the first to (n+1)th return target points and returning to the origin.

28 Claims, 9 Drawing Sheets

(56) References Cited

U.S. PATENT DOCUMENTS

| | | | |
|---|---|---|---|
| 8,494,677 B2* | 7/2013 | Mizutani | G05B 19/423 |
| | | | 700/250 |
| 8,829,460 B2* | 9/2014 | Nikolic | H01L 31/085 |
| | | | 250/390.01 |
| 8,960,888 B2* | 2/2015 | Yamanobe | B41J 11/002 |
| | | | 347/14 |
| 10,202,190 B2* | 2/2019 | Tao | G05D 1/0061 |

* cited by examiner

CONTROL METHOD, CONTROL DEVICE, ROBOT SYSTEM, PROGRAM, AND RECORDING MEDIUM

CROSS-REFERENCE TO RELATED APPLICATIONS

[0001] This application is based on PCT filing PCT/JP2020/037981, filed Oct. 7, 2020, which claims priority to and the benefit of Japanese Patent Application No. 2019-186009 filed on Oct. 9, 2019, the entire contents of each are incorporated herein by reference.

TECHNICAL FIELD

The present disclosure relates to a control method, a control device, a robot system, a program, and a recording medium.

BACKGROUND ART

Conventionally, a technology for returning a robot to an origin has been known. For example, when an operating robot stops for some reason, before the robot is restarted, a movable portion of the robot is returned to an origin position which is the initial position, that is, the robot is returned to an origin. For example, PTL 1 discloses an origin return control method for a robot. In this control method, the robot is returned from a stop position to a work origin by sequentially and reversely executing an already executed control program.

CITATION LIST

Patent Literature

PTL 1: Japanese Laid-Open Patent Publication No. H7-28520

SUMMARY OF INVENTION

For example, when the path on which the robot operates includes a reciprocating path on which the robot reciprocates between two points, the origin return control method of PTL 1 can cause the robot to reciprocate on the reciprocating path in the operation of returning to the work origin. Therefore, the operation of returning the robot to the work origin may be complicated.

An object of the present disclosure is to provide a control method, a control device, a robot system, a program, and a recording medium which simplify operation of a robot for origin return.

In order to achieve the above object, a control method according to an aspect of the present disclosure is a control method for a robot that performs operation of moving an end effector sequentially to operation target points on an operation path, the control method including: recording information of the operation target point that is a destination, each time the end effector moves to the operation target point; acquiring a present position of the end effector upon receiving an origin return command to return the end effector to an origin of the operation path; detecting information of a first return target point that is the operation target point already reached immediately before the present position or the operation target point having a distance closest to the present position among information of the operation target points already reached by the end effector before the present position, as information of a point on a return path for returning the end effector to the origin; detecting information of a (k+1)th return target point that is the operation target point already reached immediately before a kth return target point or the operation target point having a distance closest to the kth return target point among information of the operation target points already reached by the end effector before the kth return target point, as information of a point on the return path, wherein k is a natural number from 1 to n and n is a natural number of 1 or more; repeating detection of the information of the (k+1)th return target point to detect information of a second return target point to an (n+1)th return target point; determining the return path passing through the first return target point to the (n+1)th return target point in this order and returning to the origin; and moving the end effector along the return path.

Moreover, a control device according to an aspect of the present disclosure is a control device that executes the control method according to the aspect of the present disclosure.

Moreover, a robot system according to an aspect of the present disclosure includes the control device according to the aspect of the present disclosure and the robot, and the control device controls operation of the robot.

Moreover, a program according to an aspect of the present disclosure is a program executed by a computer, the program causing the computer to: in a process in which a robot moves an end effector sequentially to operation target points on an operation path, record information of the operation target point that is a destination, each time the end effector moves to the operation target point; acquire a present position of the end effector upon receiving an origin return command to return the end effector to an origin of the operation target points; detect information of a first return target point that is the operation target point already reached immediately before the present position or the operation target point having a distance closest to the present position among information of the operation target points already reached by the end effector before the present position, as information of a point on a return path for returning the end effector to the origin; detect information of a (k+1)th return target point that is the operation target point already reached immediately before a kth return target point or the operation target point having a distance closest to the kth return target point among information of the operation target points already reached by the end effector before the kth return target point, as information of a point on the return path, wherein k is a natural number from 1 to n and n is a natural number of 1 or more; repeat detection of the information of the (k+1)th return target point to detect information of a second return target point to an (n+1)th return target point; and determine the return path passing through the first return target point to the (n+1)th return target point in this order and returning to the origin.

Moreover, a recording medium according to an aspect of the present disclosure has recorded therein the program according to the aspect of the present disclosure.

According to the technology of the present disclosure, it is possible to simplify the operation of the robot for origin return.

DESCRIPTION OF EMBODIMENTS

Figure 1:
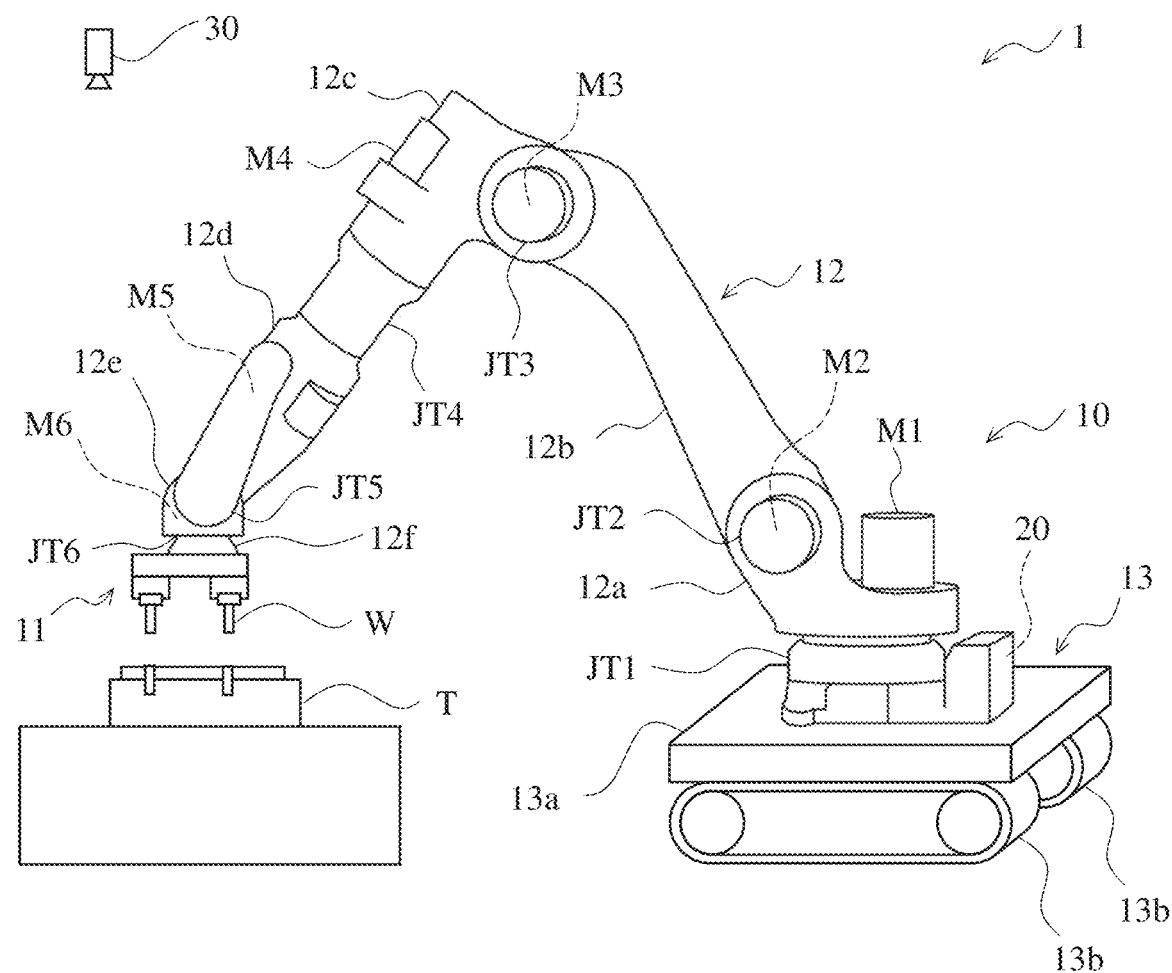
FIG. 1 is a schematic diagram showing an example of a robot system according to an embodiment.
Figure 1:
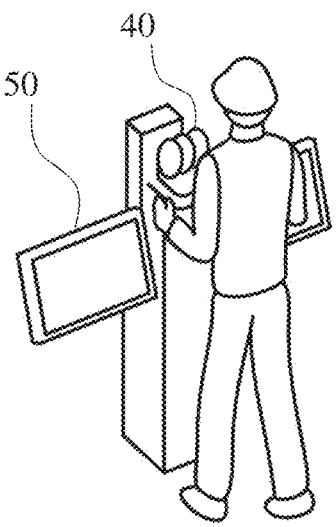

First, examples of aspects of the present disclosure will be described. A control method according to an aspect of the present disclosure is a control method for a robot that performs operation of moving an end effector sequentially to operation target points on an operation path, the control method including: recording information of the operation target point that is a destination, each time the end effector moves to the operation target point; acquiring a present position of the end effector upon receiving an origin return command to return the end effector to an origin of the operation path; detecting information of a first return target point that is the operation target point already reached immediately before the present position or the operation target point having a distance closest to the present position among information of the operation target points already reached by the end effector before the present position, as information of a point on a return path for returning the end effector to the origin; detecting information of a (k+1)th return target point that is the operation target point already reached immediately before a kth return target point or the operation target point having a distance closest to the kth return target point among information of the operation target points already reached by the end effector before the kth return target point, as information of a point on the return path, wherein k is a natural number from 1 to n and n is a natural number of 1 or more; repeating detection of the information of the (k+1)th return target point to detect information of a second return target point to an (n+1)th return target point; determining the return path passing through the first return target point to the (n+1)th return target point in this order and returning to the origin; and moving the end effector along the return path.

According to the above aspect, the return target point on the return path for returning the end effector to the origin is detected by using the operation target points recorded during operation of the end effector. As the return target point, the operation target point already reached immediately before or the operation target point having a closest distance is detected. Accordingly, it is possible to set a return path that does not pass through a part or some of the recorded operation target points, so that it is possible to reduce the number of return target points included in the return path. Therefore, it is possible to simplify the operation of the robot for origin return.

In the control method according to the aspect of the present disclosure, when the operation target points are detected as candidates for the return target point, the earliest reached operation target point may be determined as the return target point.

According to the above aspect, the operation target point closer to the origin on the operation path is determined as the return target point. Accordingly, it is possible to reduce the number of return target points included in the return path, so that it is possible to simplify the return path.

In the control method according to the aspect of the present disclosure, a target point distance that is a distance between the recorded operation target point and the present position may be detected, and when the target point distance is within a first threshold, the present position may be regarded as being located at the operation target point whose target point distance is within the first threshold.

According to the above aspect, a process for determining a return path from the present position to the operation target point and a process of moving the end effector along the return path become unnecessary. Therefore, it is possible to simplify the process and the operation of the robot for origin return.

In the control method according to the aspect of the present disclosure, a separation distance that is a distance between the present position and the operation path may be detected; when the separation distance is within a second threshold, detection of the return target point may be executed; and when the separation distance exceeds the second threshold, detection of the return target point may be stopped.

According to the above aspect, for example, when the separation distance exceeds the second threshold, if the end effector is returned to the first return target point, a part of the robot may interfere with an object around the robot. Therefore, it is possible to inhibit the robot from being damaged when returning to the origin.

In the control method according to the aspect of the present disclosure, a distance between the present position or the return target point and the operation target point may be a distance along the operation path.

According to the above aspect, the robot can be returned to the origin along the operation path. Accordingly, interference of the robot with an object therearound by performing operation deviating from the operation path is inhibited.

In the control method according to the aspect of the present disclosure, when a distance between the two operation target points is equal to or less than a third threshold, positions of the two operation target points may be regarded as being the same.

According to the above aspect, the process of detecting the distance between the present position of the robot or the return target point and the operation target point is simplified. Furthermore, it is possible to set a return path that does not pass through an operation path between the two operation target points between which the distance is equal to or less than the third threshold. Such a return path can simplify the operation of the robot for origin return.

In the control method according to the aspect of the present disclosure, the information of the operation target point may include information of a position of the operation target point, a section operation path that is a path from the immediately previous operation target point to the operation target point, a state of the end effector, and a position of the robot.

According to the above aspect, when the end effector is caused to perform operation for returning to the origin between the return target points, the robot can be operated in consideration of not only a change in the position of the end effector but also the operation path of the end effector, a change in the state of the end effector, and a change in the position of the robot. Therefore, interference of the robot with an object therearound when returning to the origin is inhibited.

In the control method according to the aspect of the present disclosure, the position of the operation target point may include a three-dimensional position of the operation target point and a posture of a reference axis at the operation target point.

According to the above aspect, when the end effector is caused to perform operation for returning to the origin between the return target points, the end effector can be operated in consideration of not only a change in the position of the end effector but also a change in the posture of the end effector. Therefore, interference of the end effector or the like with an object therearound when returning to the origin is inhibited.

In the control method according to the aspect of the present disclosure, the distance between the present position or the return target point and the operation target point may include a distance between a three-dimensional position of the present position or the return target point and the three-dimensional position of the operation target point and a distance between a posture of the reference axis at the present position or the return target point and the posture of the reference axis at the operation target point.

According to the above aspect, the distance between the present position or the return target point and the operation target point includes not only the distance between the three-dimensional positions thereof but also the distance of the posture change therebetween. Such a distance can indicate the movement distance of the end effector between the present position or the return target point and the operation target point. Therefore, it is possible to detect the next return target point by using the accurate distance between the present position or the return target point and the operation target point.

In the control method according to the aspect of the present disclosure, when the end effector is moved from the kth return target point to the (k+1)th return target point, a position of the (k+1)th return target point may be determined as a target position for the end effector, a path that is reverse to the section operation path included in information of the kth return target point may be determined as a target operation path for the end effector, the state of the end effector included in the information of the kth return target point may be determined as a target state for the end effector, and the position of the robot included in the information of the (k+1)th return target point may be determined as a target position for the robot.

According to the above aspect, when the end effector is moved from the kth return target point to the (k+1)th return target point, the operating region of the robot when returning to the origin is inhibited from greatly deviating from the operating region of the robot when the end effector moves along the operation path. Therefore, interference of the robot with an object therearound when rerunning to the origin is inhibited.

In the control method according to the aspect of the present disclosure, when the end effector is moved from the present position thereof to the first return target point, a position of the first return target point may be determined as a target position for the end effector, a path that is reverse to the section operation path included in information of a destination operation target point that is the operation target point that is the destination for the present position may be determined as a target operation path for the end effector, the state of the end effector included in the information of the destination operation target point may be determined as a target state for the end effector, and the position of the robot included in information of the first return target point may be determined as a target position for the robot.

According to the above aspect, when the end effector is moved from the present position to the first return target point, the operating region of the robot when returning to the origin is inhibited from greatly deviating from the operating region of the robot when the end effector moves along the operation path.

In the control method according to the aspect of the present disclosure, the operation target point may be a target point of the operation taught to the robot in a process of teaching the operation to the robot.

According to the above configuration, setting of the operation target points is simplified, and detection of the return target point using the operation target points is simplified.

A control device according to an aspect of the present disclosure is a control device that executes the control method according to the aspect of the present disclosure. According to the above aspect, the same effects as those of the control method according to the aspect of the present disclosure are achieved.

A robot system according to an aspect of the present disclosure includes the control device according to the aspect of the present disclosure and the robot, and the control device controls operation of the robot. According to the above aspect, the same effects as those of the control method according to the aspect of the present disclosure are achieved.

A program according to an aspect of the present disclosure is a program executed by a computer, the program causing the computer to: in a process in which a robot moves an end effector sequentially to operation target points on an operation path, record information of the operation target point that is a destination, each time the end effector moves to the operation target point; acquire a present position of the end effector upon receiving an origin return command to return the end effector to an origin of the operation target points; detect information of a first return target point that is the operation target point already reached immediately before the present position or the operation target point having a distance closest to the present position among information of the operation target points already reached by the end effector before the present position, as information of a point on a return path for returning the end effector to the origin; detect information of a (k+1)th return target point that is the operation target point already reached immediately before a kth return target point or the operation target point having a distance closest to the kth return target point among information of the operation target points already reached by the end effector before the kth return target point, as information of a point on the return path, wherein k is a natural number from 1 to n and n is a natural number of 1 or more; repeat detection of the information of the (k+1)th return target point to detect information of a second return target point to an (n+1)th return target point; and determine the return path passing through the first return target point to the (n+1)th return target point in this order and returning to the origin. According to the above aspect, the same effects as those of the control method according to the aspect of the present disclosure are achieved.

The program according to the aspect of the present disclosure may be an application program that runs on a system program of a control device that controls operation of the robot.

According to the above aspect, the application program is allowed to function, for example, when the application program is incorporated as a part of the system program or installed in the system program.

In the program according to the aspect of the present disclosure, the application program may be allowed to run when the application program is installed and incorporated in the system program.

According to the above aspect, the application program can be configured to be able to be installed in various system programs, and can have versatility.

In the program according to the aspect of the present disclosure, when the operation target points are detected as candidates for the return target point, the earliest reached operation target point may be determined as the return target point.

In the program according to the aspect of the present disclosure, a target point distance that is a distance between the recorded operation target point and the present position may be detected, and when the target point distance is within a first threshold, the present position may be regarded as being located at the operation target point whose target point distance is within the first threshold.

In the program according to the aspect of the present disclosure, a separation distance that is a distance between the present position and the operation path may be detected; when the separation distance is within a second threshold, detection of the return target point may be executed; and when the separation distance exceeds the second threshold, detection of the return target point may be stopped.

In the program according to the aspect of the present disclosure, a distance between the present position or the return target point and the operation target point may be a distance along the operation path.

In the program according to the aspect of the present disclosure, when a distance between the two operation target points is equal to or less than a third threshold, positions of the two operation target points may be regarded as being the same.

In the program according to the aspect of the present disclosure, the information of the operation target point may include information of a position of the operation target point, a section operation path that is a path from the immediately previous operation target point to the operation target point, a state of the end effector, and a position of the robot.

In the program according to the aspect of the present disclosure, the position of the operation target point may include a three-dimensional position of the operation target point and a posture of a reference axis at the operation target point.

In the program according to the aspect of the present disclosure, the distance between the present position or the return target point and the operation target point may include a distance between a three-dimensional position of the present position or the return target point and the three-dimensional position of the operation target point and a distance between a posture of the reference axis at the present position or the return target point and the posture of the reference axis at the operation target point.

In the program according to the aspect of the present disclosure, in a section return path from the kth return target point to the (k+1)th return target point in the return path, a position of the (k+1)th return target point may be determined as a target position for the end effector, a path that is reverse to the section operation path included in information of the kth return target point may be determined as a target operation path for the end effector, the state of the end effector included in the information of the kth return target point may be determined as a target state for the end effector, and the position of the robot included in the information of the (k+1)th return target point may be determined as a target position for the robot.

In the program according to the aspect of the present disclosure, in a section return path from the present position to the first return target point in the return path, a position of the first return target point may be determined as a target position for the end effector, a path that is reverse to the section operation path included in information of a destination operation target point that is the operation target point that is the destination for the present position may be determined as a target operation path for the end effector, the state of the end effector included in the information of the destination operation target point may be determined as a target state for the end effector, and the position of the robot included in information of the first return target point may be determined as a target position for the robot.

In the program according to the aspect of the present disclosure, the operation target point may be a target point of the operation taught to the robot in a process of teaching the operation to the robot.

A recording medium according to an aspect of the present disclosure has recorded therein the program according to the aspect of the present disclosure. According to the above aspect, the same effects as those of the program according to the aspect of the present disclosure are achieved.

Embodiments

Hereinafter, embodiments of the present disclosure will be described with reference to the drawings. The embodiments described below are all comprehensive or specific examples. In addition, among the components in the following embodiments, the components not described in the independent claims which represent broadest concepts are described as optional components. Moreover, each figure in the accompanying drawings is a schematic view and is not necessarily exactly illustrated. Furthermore, in each figure, substantially the same components are designated by the same reference signs, and the repetitive description thereof may be omitted or simplified. Moreover, in the present description and claims, the "device" may mean not only one device but also a system including a plurality of devices.

[Configuration of Robot System]

The configuration of a robot system 1 according to an embodiment will be described. FIG. 1 is a schematic diagram showing an example of the robot system 1 according to the embodiment. As shown in FIG. 1, the robot system 1 according to the embodiment includes a robot 10, a control device 20, an imaging device 30, an input device 40, and a presentation device 50. The robot system 1 can cause the robot 10 to automatically operate according to a taught operation procedure to execute predetermined work. The robot system 1 can cause the robot 10 to manually operate according to manipulation information inputted via the input device 40, to execute work. Furthermore, for example, when an origin return command which is a command to return the robot 10 to an operation origin position is inputted via the input device 40, the robot system 1 can automatically operate the robot 10 to return to the origin position.

In the present embodiment, the robot 10 is an industrial robot, but is not limited thereto. The robot 10 includes an end effector 11 which applies an action to each processing object W, a robot arm 12 which moves the end effector 11 so as to execute the action, and a transfer device 13 which moves the robot 10 so as to change the position of the robot 10.

The robot arm 12 is not particularly limited as long as the robot arm 12 has a configuration capable of changing the position and the posture of the end effector 11 at the distal end thereof. In the present embodiment, the robot arm 12 is a vertical articulated robot arm. The robot arm 12 may be configured as, for example, a horizontal articulated robot arm, a polar coordinate robot arm, a cylindrical coordinate robot arm, a Cartesian coordinate robot, or another type of robot arm.

The robot arm 12 includes links 12*a* to 12*f* which are sequentially disposed from a proximal portion thereof toward the distal end thereof, joints JT1 to JT6 which sequentially connect the links 12*a* to 12*f*, and arm drivers M1 to M6 which rotationally drive the joints JT1 to JT6, respectively. The operation of the arm drivers M1 to M6 is controlled by the control device 20. Each of the arm drivers M1 to M6 uses electric power as a power source and has a servomotor SMa (see FIG. 5) as an electric motor which drives the arm driver, but is not limited thereto. The number of joints of the robot arm 12 is not limited to six, and may be seven or more, or may be one or more and five or less.

The link 12*a* is attached to the transfer device 13. A distal end portion of the link 12*f* forms a mechanical interface and is connected to the end effector 11. The joint JT1 couples the transfer device 13 and a proximal end portion of the link 12*a* such that the transfer device 13 and the proximal end portion of the link 12*a* are rotatable about an axis extending in a vertical direction perpendicular to a floor surface on which the transfer device 13 is supported. The joint JT2 couples a distal end portion of the link 12*a* and a proximal end portion of the link 12*b* such that the distal end portion of the link 12*a* and the proximal end portion of the link 12*b* are rotatable about an axis extending in a horizontal direction which is parallel to the floor surface. The joint JT3 couples a distal end portion of the link 12*b* and a proximal end portion of the link 12*c* such that the distal end portion of the link 12*b* and the proximal end portion of the link 12*c* are rotatable about an axis extending in the horizontal direction. The joint JT4 couples a distal end portion of the link 12*c* and a proximal end portion of the link 12*d* such that the distal end portion of the link 12*c* and the proximal end portion of the link 12*d* are rotatable about an axis extending in the longitudinal direction of the link 12*c*. The joint JT5 couples a distal end portion of the link 12*d* and a proximal end portion of the link 12*e* such that the distal end portion of the link 12*d* and the proximal end portion of the link 12*e* are rotatable about an axis extending in a direction orthogonal to the longitudinal direction of the link 12*d*. The joint JT6 couples a distal end portion of the link 12*e* and a proximal end portion of the link 12*f* such that the proximal end portion of the link 12*f* is twistable and rotatable with respect to the link 12*e*.

The end effector 11 is detachably attached to a distal end portion of the robot arm 12. The end effector 11 is configured to be able to add various actions corresponding to the processing objects W, such as grasping, sucking, lifting, or scooping up, to the processing objects W. In the example of FIG. 1, the end effector 11 is configured to be able to grasp the processing objects W and screw the processing objects W into holes of an object T to be processed, and the robot 10 performs work of assembling the processing objects W to the object T to be processed. The end effector 11 includes an end effector driver 11*a* (see FIG. 5) which drives the end effector 11. The operation of the end effector driver 11*a* is controlled by the control device 20. The end effector driver 11*a* uses electric power as a power source and has a servomotor SMb (see FIG. 5) as an electric motor which drives the end effector driver 11*a*, but is not limited thereto. The work of the robot 10 is not limited to the above assembly, and may be any work. Examples of the work of the robot 10 include sorting, assembly, painting, welding, joining, chipping, polishing, sealing, semiconductor manufacturing, and medical activities such as drug formulation and surgery.

The transfer device 13 can move the robot 10 on the floor surface or the like, and includes a base 13*a* on which the robot arm 12 is placed and which supports the robot arm 12, crawlers (also referred to as "caterpillars (registered trademark)") 13*b* as traveling means for the base 13*a*, and a transfer driver 13*c* (see FIG. 5) which drives the crawlers 13*b*. The traveling means is not limited to the crawlers 13*b*, and may be other traveling means such as wheels. The transfer driver 13*c* uses electric power as a power source and has a servomotor SMc (see FIG. 5) as an electric motor, but is not limited thereto. The transfer device 13 may be an AGV (Automated Guided Vehicle) or the like.

The imaging device 30 takes an image of the robot 10, specifically, takes an image of the processing status of the processing objects W of the robot 10. Examples of the imaging device 30 include a digital camera and a digital video camera. For example, the imaging device 30 is disposed at a position away from the robot 10, but may be disposed at the robot 10. The imaging device 30 outputs a signal of the taken image to the presentation device 50, but may output the signal to the control device 20. A user who manages the robot system 1 can check the processing status of the processing objects W by the robot 10 via the presentation device 50. The operation of the imaging device 30 may be controlled by the control device 20.

The input device 40 receives input of commands, information, data, etc., by the user of the robot system 1, and outputs the commands, the information, the data, etc., to the control device 20. The input device 40 is connected to the control device 20 via wired communication or wireless communication. The types of wired communication and wireless communication may be any types. For example, the input device 40 receives input of a command to return the robot 10 to an origin, and outputs the command to the control device 20. The input device 40 may include a teaching device such as a teaching pendant for teaching the robot 10 an operation procedure of predetermined work.

The presentation device 50 presents various images, sounds, etc., received from the control device 20 and the imaging device 30, to the user of the robot system 1. Examples of the presentation device 50 include, but are not limited to, a liquid crystal display and an organic or inorganic EL display (Electro-Luminescence Display). The presentation device 50 may include a speaker which emits sound.

The control device 20 controls the entire robot system 1. For example, the control device 20 includes a computer device. The following four coordinate systems are set for the robot 10. The control device 20 controls the position, the posture, and the operating state of each component of the robot 10 on the basis of the four coordinate systems.

Figure 2:
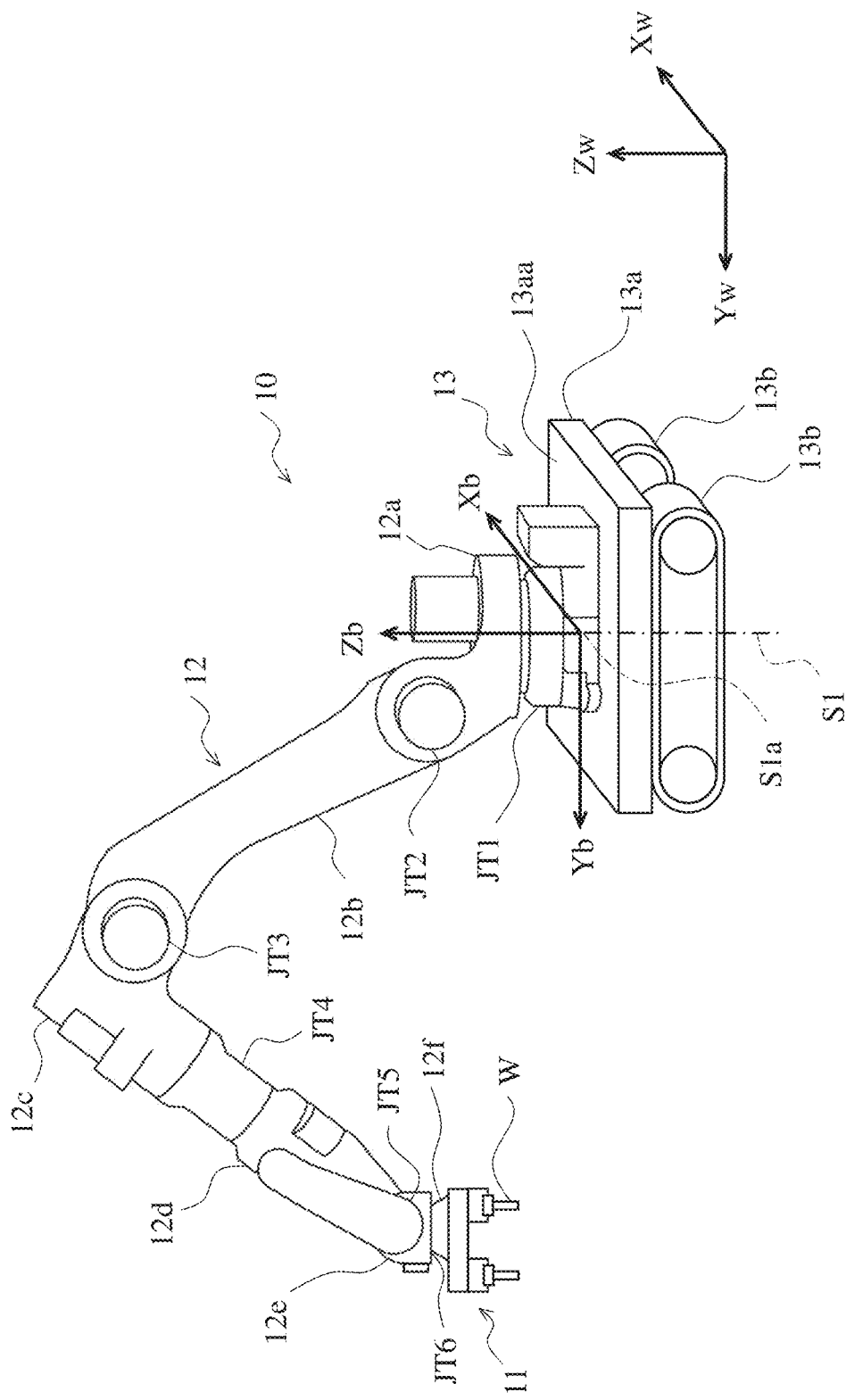
FIG. 2 is a perspective view of a robot in FIG. 1.

A first coordinate system is a coordinate system set in the space where the robot 10 is disposed, and is referred to as a world coordinate system. For example, as shown in FIG. 2, an Xw axis, a Yw axis, and a Zw axis are defined in the world coordinate system. The Xw axis and the Yw axis extend along the floor surface on which the robot 10 is disposed, and are orthogonal to each other. The Zw axis extends perpendicular to the Xw axis and the Yw axis, that is, perpendicular to the floor surface, the direction upward from the floor surface is a Zw axis positive direction, and the direction opposite thereto is a Zw axis negative direction. FIG. 2 is a perspective view of the robot 10 in FIG. 1.

A second coordinate system is a coordinate system based on the base 13a of the transfer device 13 on which the robot arm 12 is installed, and is referred to as a base coordinate system. For example, as shown in FIG. 2, an Xb axis, a Yb axis, and a Zb axis are defined in the base coordinate system. For example, the Xb axis and the Yb axis extend along a surface 13aa of the base 13a and are orthogonal to each other. The Zb axis extends perpendicular to the Xb axis and the Yb axis, that is, perpendicular to the surface 13aa. For example, the origin of the base coordinate system is a point of intersection S1a of a rotation center axis S1 of the joint and the surface 13aa. The direction upward from the surface 13aa is a Zb axis positive direction, and the direction opposite thereto is a Zb axis negative direction.

Figure 3:
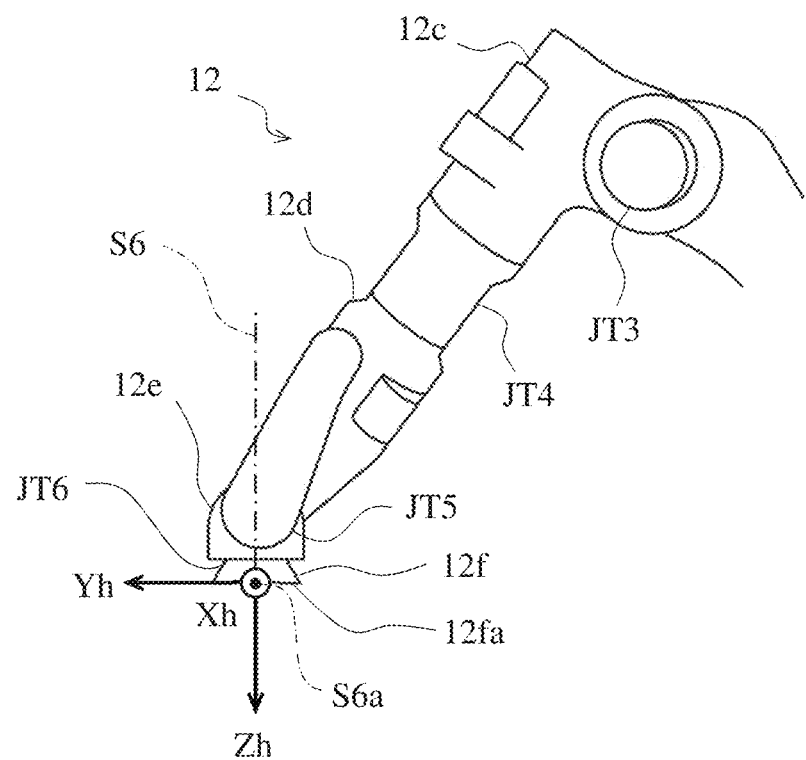
FIG. 3 is a side view of a distal end portion of a robot arm in FIG. 2.

A third coordinate system is a coordinate system based on a connection surface 12fa, of the distal end portion of the link 12f of the robot arm 12, which is connected to the end effector 11, and is referred to as a hand coordinate system. For example, as shown in FIG. 3, an Xh axis, a Yh axis, and a Zh axis are defined in the hand coordinate system. For example, the Xh axis and the Yh axis extend along the connection surface 12fa and are orthogonal to each other. The Zh axis extends perpendicular to the Xh axis and the Yh axis, that is, perpendicular to the connection surface 12fa. For example, the origin of the hand coordinate system is a point of intersection S6a of a rotation center axis S6 of the joint JT6 and the connection surface 12fa, and the Zh axis is parallel to the rotation center axis S6. The direction from the link 12f toward the end effector 11 is a Zh axis positive direction, and the direction opposite thereto is a Zh axis negative direction. The Xh axis, the Yh axis, and the Zh axis change the orientations thereof in response to the orientation of the axis S6 and rotation of the link 12f about the axis S6. FIG. 3 is a side view of the distal end portion of the robot arm 12 in FIG. 2.

Figure 4:
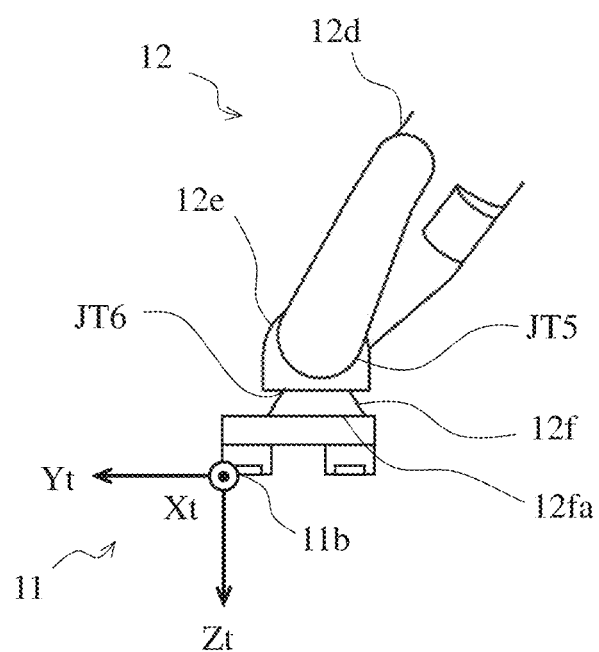
FIG. 4 is a side view of an end effector in FIG. 2.

A fourth coordinate system is a coordinate system based on a specific point of the end effector 11 such as a distal end portion 11b of the end effector 11, and is referred to as a tool coordinate system. For example, as shown in FIG. 4, Xt axis, a Yt axis, and a Zt axis are defined in the tool coordinate system. For example, the Zt axis is an axis along one of the directions in which the distal end portion 11b extends. The Xt axis and the Yt axis are orthogonal to each other and are orthogonal to the Zt, and are, for example, parallel to the connection surface 12fa. For example, the origin of the tool coordinate system is the distal end portion 11b. The direction away from the distal end portion 11b is a Zt axis positive direction, and the direction opposite thereto is a Zt axis negative direction. The Xt axis, the Yt axis, and the Zt axis change the orientations thereof in response to the orientation of the distal end portion 11b. FIG. 4 is a side view of the end effector 11 in FIG. 2.

For example, the control device 20 controls the position and the posture of the transfer device 13 on the basis of the coordinates of the point of intersection S1a of the transfer device 13 and a direction vector of the axis S1 in the world coordinate system. The control device 20 controls the position and the posture of the connection surface 12fa of the link 12f on the basis of the coordinates of the point of intersection S6a of the link 12f of the robot arm 12 and a direction vector of the axis S6 in the base coordinate system. The control device 20 controls the position and the posture of the distal end portion 11b of the end effector 11 on the basis of the relationship between the Xh axis, the Yh axis, and the Zh axis of the hand coordinate system and the Xt axis, the Yt axis, and the Zt axis of the tool coordinate system.

[Hardware Configuration of Control Device]

Figure 5:
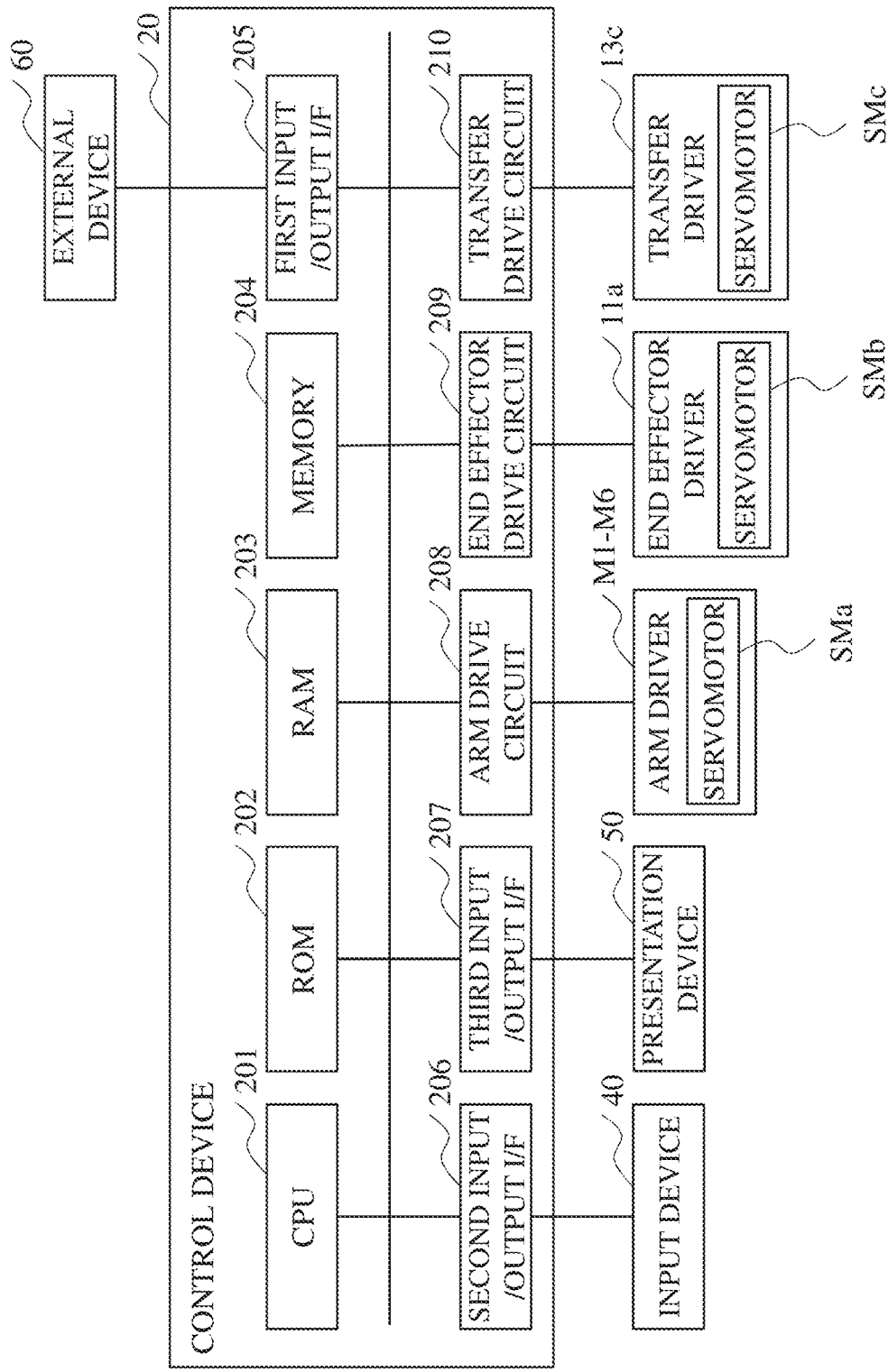
FIG. 5 is a block diagram showing an example of the hardware configuration of a control device according to the embodiment.

The hardware configuration of the control device 20 will be described. FIG. 5 is a block diagram showing an example of the hardware configuration of the control device 20 according to the embodiment. As shown in FIG. 5, the control device 20 includes a CPU (Central Processing Unit) 201, a ROM (Read Only Memory) 202, a RAM (Random Access Memory) 203, a memory 204, input/output I/Fs (Interfaces) 205 to 207, an arm drive circuit 208, an end effector drive circuit 209, and a transfer drive circuit 210 as components. The above components are connected to each other via a bus, wired communication, or wireless communication. Not all of the above components are essential.

For example, the CPU 201 is a processor, and controls the overall operation of the control device 20. The ROM 202 includes a non-volatile semiconductor memory or the like, and stores a program, data, etc., for causing the CPU 201 to control the operation. The RAM 203 includes a volatile semiconductor memory or the like, and temporarily stores a program executed by the CPU 201, data in the middle of processing or processed data, etc. The memory 204 includes a storage device such as a semiconductor memory such as a volatile memory and a non-volatile memory, a hard disk (HDD: Hard Disc Drive) and an SSD (Solid State Drive), and the memory 204 stores various kinds of information. The memory 204 may be a device external to the control device 20.

For example, a program for operating the CPU 201 is stored in the ROM 202 or the memory 204 in advance. The CPU 201 reads and expands the program from the ROM 202 or the memory 204 to the RAM 203. The CPU 201 executes each coded instruction in the program expanded to the RAM 203.

Each function of the control device 20 may be realized by a computer system including the CPU 201, the ROM 202, the RAM 203, etc., may be realized by a dedicated hardware circuit such as an electronic circuit or an integrated circuit, or may be realized by a combination of the computer system and the hardware circuit.

Such a control device 20 may include, for example, a microcontroller, an MPU (Micro Processing Unit), an LSI (Large Scale Integrated circuit), a system LSI, a PLC (Programmable Logic Controller), a logic circuit, etc. The functions of the control device 20 may be realized by being individually integrated into one chip, or may be realized by being integrated into one chip so as to include a part or all of the functions. In addition, each circuit may be a general-purpose circuit or may be a dedicated circuit. As the LSI, an FPGA (Field Programmable Gate Array) which can be programmed after the LSI is manufactured, a reconfigurable processor which can reconfigure the connection and/or setting of circuit cells inside the LSI, an ASIC (Application Specific Integrated Circuit) in which circuits having functions are integrated into one for a specific application, or the like may be used.

The first input/output I/F 205 is connected to an external device 60, and inputs and outputs information, data, commands, etc., with respect to the external device 60. The first input/output I/F 205 may include a circuit that converts a signal, etc. For example, the first input/output I/F 205 receives input of a program file from the external device 60. An example of the program file is a program file of an application program that returns the robot to the origin. Examples of the external device 60 include a recording media drive that controls reading or writing of various kinds of data from or to a recording medium, a storage device, computer devices such as a personal computer, an information terminal, and smart devices such as a smartphone, a smart watch, and a tablet. Examples of the recording medium include a flash memory, a memory card, and recording discs such as a CD (Compact Disc)-R (Recordable), a CD-RW (Rewritable), a DVD (Digital Versatile Disc)-R, a DVD-RW, a BD (Blu-ray (registered trademark) Disc))-R, and a BD-RE (Rewritable). The external device 60 may be incorporated in the control device 20.

The first input/output I/F 205 may form a network I/F and be connected to the external device 60 via a communication network capable of data communication. The communication network may be, for example, an intranet, a wired or wireless LAN (Local Area Network), a WAN (Wide Area Network), a mobile communication network, a telephone line communication network, or another communication network using wired or wireless communication. In this case, the external device 60 may be a server device, a cloud server, or the like. The program file may be downloaded to the memory 204 or the like via the communication network and the first input/output I/F 205.

The second input/output I/F 206 is connected to the input device 40, and inputs and outputs information, data, commands, etc., with respect to the input device 40. The second input/output I/F 206 may include a circuit that converts a signal, etc. The third input/output I/F 207 is connected to the presentation device 50, and inputs and outputs screen data, audio data, information, commands, etc., with respect to the presentation device 50. The third input/output I/F 207 may include a GPU (Graphics Processing Unit) that can generate a screen to be displayed on the presentation device 50, a DSP (Digital Signal Processor) that can generate a sound to be outputted by the presentation device 50, a circuit that converts a signal, etc.

According to a command from the CPU 201, the arm drive circuit 208 supplies electric power to the servomotors SMa of the arm drivers M1 to M6 of the robot 10 and controls the drive of each servomotor SMa. According to a command from the CPU 201, the end effector drive circuit 209 supplies electric power to the servomotor SMb of the end effector driver 11*a* and controls the drive of the servomotor SMb. According to a command from the CPU 201, the transfer drive circuit 210 supplies electric power to the servomotor SMc of the transfer driver 13*c* of the transfer device 13 and controls the drive of the servomotor SMc.

[Functional Configuration of Control Device]

Figure 6:
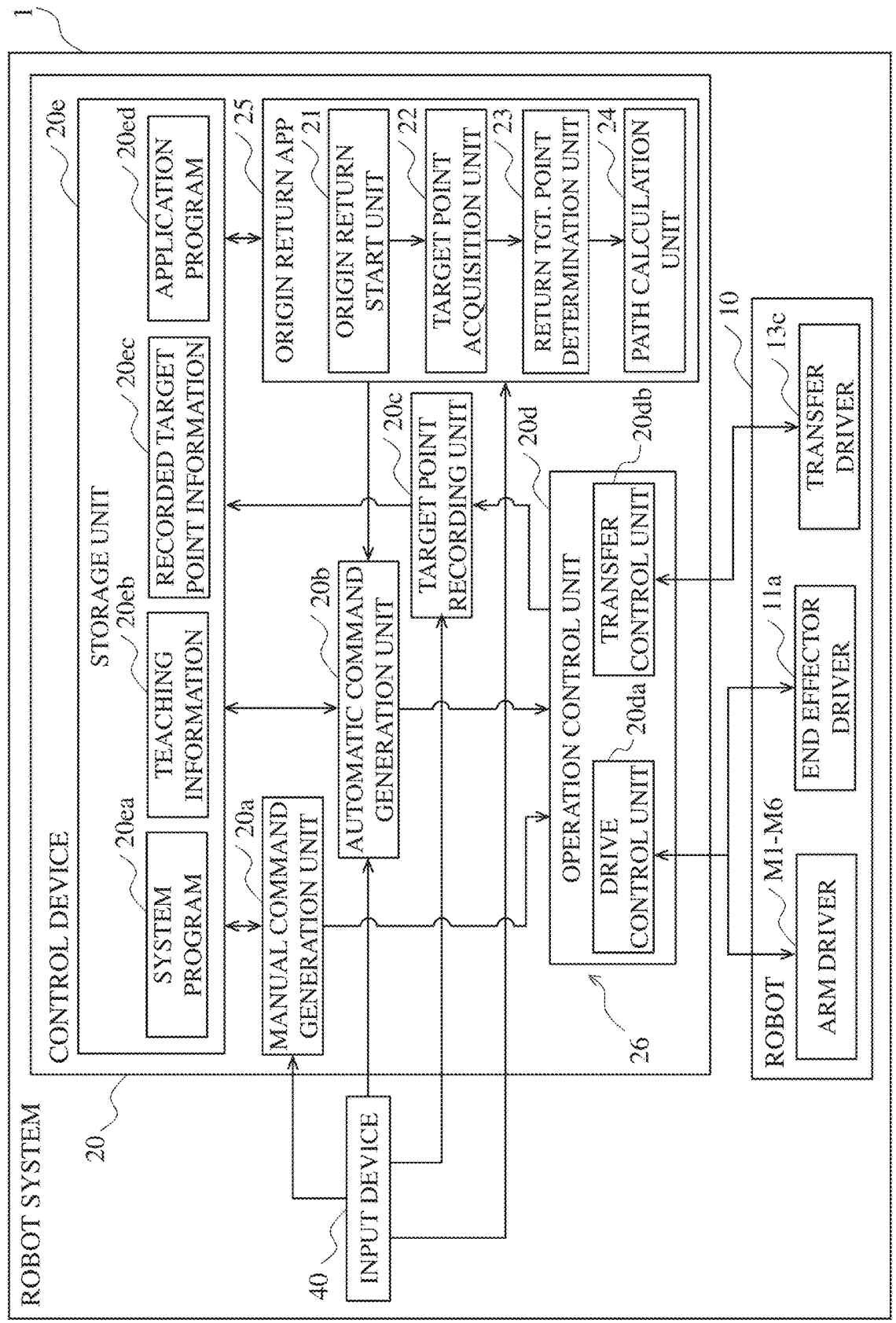
FIG. 6 is a block diagram showing an example of the functional configuration of the control device according to the embodiment.

The functional configuration of the control device 20 will be described. FIG. 6 is a block diagram showing an example of the functional configuration of the control device 20 according to the embodiment. As shown in FIG. 6, the control device 20 includes a manual command generation unit 20*a*, an automatic command generation unit 20*b*, a target point recording unit 20*c*, an operation control unit 20*d*, a storage unit 20*e*, an origin return start unit 21, a target point acquisition unit 22, a return target point determination unit 23, and a path calculation unit 24 as functional components. The operation control unit 20*d* includes a drive control unit 20*da* and a transfer control unit 20*db*. The manual command generation unit 20*a*, the automatic command generation unit 20*b*, the target point recording unit 20*c*, and the operation control unit 20*d* function on system software 26 which operates the control device 20. The origin return start unit 21, the target point acquisition unit 22, the return target point determination unit 23, and the path calculation unit 24 function on origin return application software (hereinafter, also referred to as "origin return application") 25 which runs on the system software 26. The origin return application 25 is software for causing the robot 10 to perform an origin return operation. Not all of the above functional components are essential.

The functions of the functional components other than the storage unit 20*e* are realized by the CPU 201 or the like, and the function of the storage unit 20*e* is realized by the memory 204, the ROM 202, and/or the RAM 203.

The storage unit 20*e* stores various kinds of information and allows the stored information to be read. For example, the storage unit 20*e* stores a system program 20*ea* of the system software 26 which operates the control device 20.

Furthermore, the storage unit 20*e* stores teaching information 20*eb* stored as a result of teaching for causing the robot 10 to perform predetermined work. The teaching method for the robot 10 is, for example, direct teaching by a teacher directly contacting and operating the robot 10, teaching by remote control using a teaching pendant, teaching by programming, and teaching by master/slave, or the like, but may be any teaching method.

The teaching information 20*eb* includes information of operation target points. Each operation target point is a taught point, and is a point through which a predetermined point of the robot 10 such as the origin S6*a*, of the hand coordinate system of the end effector 11 passes during operation of the robot 10 for performing work. Operation target points are set for one predetermined work. The operation target points are ordered according to a passing order of the robot 10. The operation target points form an operation path to be followed by the predetermined point of the robot 10 in order to perform work.

Figure 7:
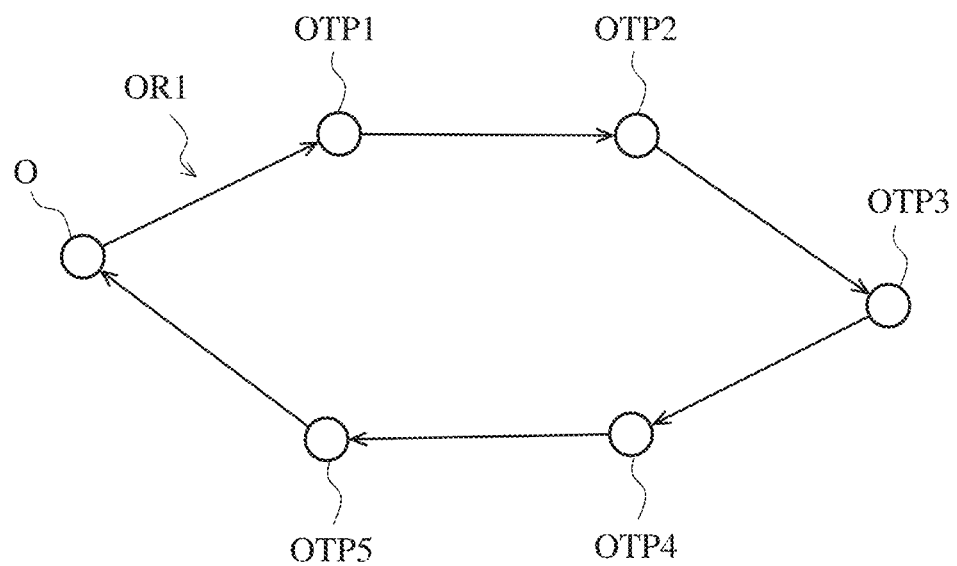
FIG. 7 is a diagram showing an example of an operation path according to teaching information of the robot according to the embodiment.
Figure 8:
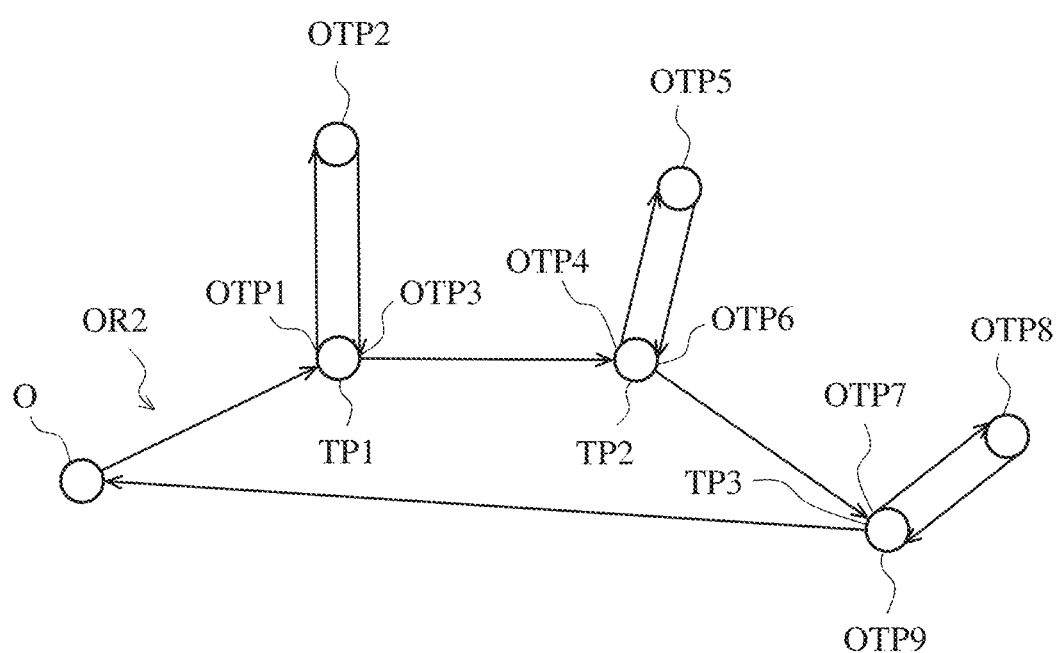
FIG. 8 is a diagram showing an example of an operation path according to teaching information of the robot according to the embodiment.

For example, the teaching information 20*eb* includes operation paths including operation target points as shown in FIG. 7 and FIG. 8. FIG. 7 and FIG. 8 are each a diagram showing an example of an operation path according to the teaching information 20*eb* of the robot 10 according to the embodiment.

For example, an operation path OR1 shown in FIG. 7 is a path that leads from an origin O, which is a starting position, sequentially passes through a first operation target point OTP1 to a fifth operation target point OTP5, the positions of which are different from each other, and returns to the origin O. The origin O may be a starting position for all operation paths for executing predetermined work, or may be a position designated in the middle of the operation path by a command or the like from the input device 40 during execution of predetermined work.

An operation path 0R2 shown in FIG. 8 is a path that leads from an origin O, sequentially passes through a first operation target point OTP1 to a ninth operation target point OTP9, and returns to the origin O. However, the first operation target point OTP1 and the third operation target point OTP3 are positioned at the same first target point TP1. The fourth operation target point OTP4 and the sixth operation target point OTP6 are positioned at the same second target point TP2. The seventh operation target point OTP7 and the ninth operation target point OTP9 are positioned at the same third target point TP3. Between the first operation target point OTP1 and the third operation target point OTP3, between the fourth operation target point OTP4 and the sixth operation target point OTP6, and between the seventh operation target point OTP7 and the ninth operation target point OTP9, information other than the positions of operation target points described later may be different.

The information of each operation target point may include information of the position of the operation target point, a section operation path that is a path from the immediately previous operation target point to the operation target point, the state of the end effector 11 at the operation target point, the position of the robot at the operation target point, etc. The position of the operation target point may include the three-dimensional position of the operation target point and the posture of a reference axis at the operation target point. The three-dimensional position is a position in a three-dimensional space.

The three-dimensional position of the operation target point may be the three-dimensional position of the operation target point in the world coordinate system. For example, the operation target point is a target point for the end effector 11. In the present embodiment, the operation target point is a target point for the point S6a on the connection surface 12fa of the link 12f of the robot arm 12, but is not limited thereto. The reference axis may be the Zh axis of the hand coordinate system of the robot 10, that is, the rotation center axis S6 of the joint JT6 of the robot arm 12. The posture of the Zh axis, that is, the posture of the axis S6, is an example of the posture of the reference axis.

The three-dimensional position and the posture of the operation target point are shown by using a position and an Euler angle based on the relationship between the Xw axis, the Yw axis, and the Zw axis of the world coordinate system and the Xh axis, the Yh axis, and the Zh axis of the hand coordinate system with the world coordinate system as a reference. Such a three-dimensional position and posture of the operation target point include an Xw axis element "xw", a Yw axis element "yw", and a Zw axis element "zw", and Euler angle elements "Ow", "Aw", and "Tw" in the world coordinate system.

The information of the section operation path is information of a path from the operation target point (hereinafter, also referred to as "immediately previous operation target point") in the order immediately before the operation target point to the operation target point, and is interpolation information that interpolates between the operation target point and the immediately previous operation target point. Such interpolation information includes the shape, the size, and the direction of the section operation path, and the drive directions and the drive amounts of the joints JT1 to JT6 of the robot arm 12 in the section operation path. Examples of the shape of the path include a linear shape and curved shapes such as an arc and a spline curve. The size of the path is the curvature of a curved shape, or the like. The direction of the path is a curved direction of a curved shape, or the like. The information of the section operation path is also referred to as "interpolation mode".

The information of the state of the end effector includes the position and the posture of a specific part of the end effector 11. The specific part is the distal end portion 11b of the end effector 11 in the present embodiment, but is not limited thereto. The position and the posture of the distal end portion 11b may be a position and a posture with respect to the connection surface 12fa of the link 12f of the robot arm 12. The position and the posture of the distal end portion 11b are shown by using a position and an Euler angle based on the relationship between the Xh axis, the Yh axis, and the Zh axis of the hand coordinate system and the Xt axis, the Yt axis, and the Zt axis of the tool coordinate system with the hand coordinate system as a reference. Such a position and posture of the distal end portion 11b include an Xh axis element "xht", a Yh axis element "yht", and a Zh axis element "zht", and Euler angle elements "Oht", "Aht", and "Tht" in the hand coordinate system. In addition, the information of the state of the end effector may include the state of the end effector 11 operated by the end effector driver 11a. The information of the state of the end effector is also referred to as "tool value".

The information of the position of the robot 10 may include the three-dimensional position of the robot 10 in the world coordinate system. In the present embodiment, the three-dimensional position of the robot 10 is the three-dimensional position of the point of intersection S1a on the axis S1 of the robot 10, but is not limited thereto. The information of the position of the robot 10 may include the posture of the robot 10 in the world coordinate system. In the present embodiment, the posture of the robot 10 is the posture of the axis S1, but is not limited thereto. The information of the position of the robot 10 is also referred to as "base value".

The storage unit 20e further includes recorded target point information 20ec. The recorded target point information 20ec is information of an operation target point recorded by the target point recording unit 20c. The recorded target point information 20ec is information of all operation target point that is a destination and is recorded each time the end effector 11 of the robot 10 currently executing work moves to the operation target point. For example, the recorded target point information 20ec includes information of operation target points recorded by the target point recording unit 20c when the robot 10 operates according to the teaching information 20eb.

The storage unit 20e further stores an application program 20ed of the origin return application 25. In the present embodiment, the application program 20ed is a single packaged program, and can run when being installed on the system program 20ea of the control device 20. The application program 20ed runs on the system program 20ea. That is, the origin return application 25 runs on the system software 26 of the control device 20. The application program 20ed may be sent from the external device 60 to the storage unit 200 and stored in the storage unit 20e. Such an application program 20ed can be applied to control devices of various robots and has versatility. The program for origin return may be incorporated in the system program 20ea in advance.

The manual command generation unit 20a generates a manual operation command for causing the robot 10 to perform an operation corresponding to manipulation information outputted from the input device 40, and outputs the manual operation command to the operation control unit 20d. Information inputted to the input device 40 in order to manipulate the robot 10 is information for commanding operation and action force of the end effector 11 such as a position, a posture, movement, a movement speed, a force, etc., of the end effector 11. The input device 40 outputs information indicating the operation and the action force of the end effector 11 corresponding to the inputted information, as manipulation information, to the manual command generation unit 20a.

Here, the operation command includes a force command representing a force to be applied to an object by the end effector 11, that is, a force that acts on the work environment, and a position command representing a position of the end effector 11. The force command includes a command of the magnitude of a force, and may further include a command of the direction of the force. Furthermore, the force command may include a command of a time at which the force is to be generated. The position command includes a command of a position of the end effector 11, and may further include a command of a posture of the end effector 11. Furthermore, the position command may include a command of a time at which the position and/or the posture is to occur.

Moreover, the operation command may include commands of drive and drive stop of the end effector driver 11a of the end effector 11 and a position command of the transfer device 13. The position command of the transfer device 13 includes at least a position of the transfer device 13 out of a position and a posture of the transfer device 13 in the three-dimensional space.

The automatic command generation unit 20b generates an automatic operation command for causing the robot 10 to automatically perform predetermined work according to the teaching information 20eb, and outputs the automatic operation command to the operation control unit 20d. The automatic command generation unit 20b acquires information of the predetermined work to be executed by the robot 10, via the input device 40, reads the teaching information 20eb corresponding to the predetermined work, and generates an automatic operation command according to the teaching information 20eb. For example, the automatic command generation unit 20b generates an automatic operation command on the basis of information of operation target points. The automatic operation command is a command for causing the robot 10 to automatically operate along an operation path, and, similar to the manual operation command, the automatic operation command includes a position command, a force command, etc.

Furthermore, upon receiving, from the path calculation unit 24, information of a return path for returning the robot 10 to the origin, the automatic command generation unit 20b generates an automatic return operation command for causing the robot 10 to automatically operate so as to return to the origin along the return path, and outputs the automatic return operation command to the operation control unit 20d. The robot 10 operating according to the automatic return operation command does not actually perform work on any object, and thus the automatic return operation command does not have to include a force command.

The operation control unit 20d controls the operation of the robot 10 according to the manual operation command, the automatic operation command, or the automatic return operation command. The operation control unit 20d generates a command for causing each component of the robot 10 to operate according to each operation command, and outputs the command to the robot 10. In addition, the operation control unit 20d acquires information of the operating state of each component of the robot 10 from the robot 10, and generates the above command by using this information as feedback information. Furthermore, the operation control unit 20d may detect the position of each component of the robot 10 from the information of the operating state of each component of the robot 10 and output the detection result to the target point recording unit 20c.

The drive control unit 20da of the operation control unit 20d generates a command for operating the servomotors SMa of the arm drivers M1 to M6 of the robot arm 12 and the servomotor SMb of the end effector driver 11a of the end effector 11. The arm drivers M1 to M6 and the end effector driver 11a each include a rotation sensor (not shown) such as an encoder for detecting the rotation amount of the rotor of the servomotor SMa or Mb, and a current sensor (not shown) for detecting the drive current of the servomotor SMa or SMb. Furthermore, the end effector 11 includes a force sensor (not shown) for detecting the magnitude and the direction of a force acting on the end effector 11. Each rotation sensor, each current sensor, and the force sensor output the rotation amount and the drive current value of each servomotor and the detection value of the force sensor, as feedback information, to the drive control unit 20da. The drive control unit 20da controls the rotation start, the rotation stop, the rotation speed, and the rotation torque of each servomotor by using the rotation amount and the drive current value of each servomotor and the detection value of the force sensor.

Furthermore, the drive control unit 20da calculates a three-dimensional position and a three-dimensional posture of the end effector 11 by integrating the rotation amounts of all the servomotors SMa of the arm drivers M1 to M6. The drive control unit 20da generates a command to drive the servomotors SMa and SMb of the arm drivers M1 to M6 and the end effector driver 11a such that the three-dimensional position and the three-dimensional posture of the end effector 11 and the detection value of the force sensor correspond to the position command and the force command in the operation command.

In addition, the transfer control unit 20db of the operation control unit 20d generates a command for operating the servomotor SMc of the transfer driver 13c of the transfer device 13. The transfer driver 13c includes a rotation sensor (not shown) for detecting the rotation amount of the rotor of the servomotor SMc and a current sensor (not shown) for detecting the drive current of the servomotor SMc. The transfer driver 13c outputs the rotation amount and the drive current value of the servomotor SMc as feedback information to the transfer control unit 20db. The transfer control unit 20db controls the servomotor SMc by using the rotation amount and the drive current value of the servomotor SMc. The transfer control unit 20db generates a command to drive the servomotor SMc such that the position of the robot 10 corresponds to the position command in the operation command.

The transfer device 13 may include a position measuring device such as a GPS (Global Positioning System) receiver and an IMU (Inertial Measurement Unit). The transfer control unit 20db may detect the position and the posture of the transfer device 13 by using a reception signal of the GPS receiver, an acceleration and an angular velocity measured by the IMU, or the like. In addition, for example, the transfer device 13 may include a detection device for detecting a weak induced current from an electric wire embedded in the floor surface, and the transfer control unit 20db may detect the position and the posture of the transfer device 13 on the basis of a detection value of the detection device.

In the present embodiment, the target point recording unit 20c is a functional component that is generated and functions when the origin return application 25 is installed in the system software 26. However, the target point recording unit 20c may be incorporated in the system software 26 in advance. While the robot 10 is executing work, each time the end effector 11 moves to an operation target point, the target point recording unit 20c records information of the operation target point which is a destination, as the recorded target point information 20ec, and stores the information in the storage unit 20e. Therefore, the application program 20ed of the origin return application 25 causes the target point recording unit 20c to record the information of the operation target point. Moving to an operation target point means moving from another operation target point to this operation target point. In this case, it is sufficient that at least parts of information of the two operation target points are different from each other. For example, the three-dimensional positions of the two operation target points may be the same, the postures of the two operation target points may be the same, and the three-dimensional positions and the postures of the two operation target points may be the same.

Moreover, recording information of an operation target point which is a destination each time the end effector 11 moves to the operation target point may be recording the information of the operation target point, which is a destination, at any time between the time at which the end effector 11 starts moving to the operation target point which is a destination to the time when the end effector 11 reaches the operation target point which is a destination. Therefore, the case that information of an operation target point that has not been reached by the end effector 11 is recorded may be included, and the case that information of an operation target point that has already been reached by the end effector 11 is recorded may be included. In the present embodiment, the target point recording unit 20c records information of an operation target point which is a destination, at the time at which the end effector 11 starts moving to the operation target point which is a destination.

In the present embodiment, upon receiving, via the input device 40, a recording command to command recording an operation target point, the target point recording unit 20c starts recording of information of the operation target point. At this time, the target point recording unit 20c determines a recording origin which is the starting point of recording. For example, the target point recording unit 20c may determine the position of the end effector 11 at the time when the target point recording unit 20c receives the recording command, as a recording origin, or may determine an operation target point immediately before or after this position, as a recording origin. The target point recording unit 20c stores information of the recording origin in the storage unit 20e.

After the recording origin is determined, each time the end effector 11 moves to an operation target point, the target point recording unit 20c stores information of the operation target point which is a destination, in the storage unit 20e. The target point recording unit 20c adds information indicating a reach order, to the information of the operation target point, and stores the information of the operation target point in the storage unit 20e. For example, the target point recording unit 20c may add a reach order number such as "m" of an mth operation target point (m is a natural number) to the operation target point.

During operation of the robot 10, the target point recording unit 20c may acquire information of the position of each component of the robot 10 from the operation control unit 20d. The information of the position includes information of the three-dimensional position and the posture of the end effector 11. The target point recording unit 20c may detect movement of the end effector 11 to an operation target point on the basis of the information of the three-dimensional position and the posture of the end effector 11. Alternatively, the target point recording unit 20c may acquire a command to move the end effector 11 to an operation target point from the automatic command generation unit 20b and detect movement of the end effector 11 to the operation target point on the basis of the command.

Upon receiving, via the input device 40, an origin return command to command the robot 10 to return to the origin, the origin return start unit 21 loads the application program 20ed of the storage unit 20e and starts the origin return application 25. When the robot 10 is operating at a return command reception time that is the time at which the origin return start unit 21 receives the origin return command, the origin return start unit 21 may output a stop command to the automatic command generation unit 20b to stop the operation of the robot 10.

After the origin return application 25 is started, the target point acquisition unit 22 acquires the present position of the end effector 11. For example, the present position of the end effector 11 may be the position of the end effector 11 at the return command reception time, or may be the position of the end effector 11 at a predetermined timing after the origin return application 25 is started. For example, the target point acquisition unit 22 may acquire the information of the position of each component of the robot 10 from the operation control unit 20d and acquire the present position of the end effector 11 on the basis of this information, or may acquire the present position of the end effector 11 from the target point recording unit 20c.

Furthermore, the target point acquisition unit 22 searches the recorded target point information 20ec in the storage unit 20e, and acquires the information of the recording origin and the information of the operation target points stored as the recorded target point information 20ec from the recording origin start time to the return command reception time. The information of the operation target points includes information of each operation target point already reached by the end effector 11 before the present position of the end effector 11, and information of a destination operation target point which is an operation target point that is a destination of the end effector 11 at the return command reception time. The destination operation target point is an operation target point that should be first reached by the end effector 11 from the present position.

The return target point determination unit 23 determines return target points which are target points through which the end effector 11 passes for returning the robot 10 to the origin. The return target point determination unit 23 determines the return target points as points on a return path for returning the end effector to the recording origin.

First, the return target point determination unit 23 determines whether or not the present position of the end effector 11 is an operation target point. The return target point determination unit 23 detects a first target point distance which is the distance between each operation target point acquired by the target point acquisition unit 22 and the present position. When there is an operation target point whose first target point distance is within a first threshold, the return target point determination unit 23 determines that the present position is the operation target point, and determines detection of the return path of the end effector 11. When the first target point distances of all the operation target points exceed the first threshold, the return target point determination unit 23 determines that the present position is not any of the operation target points.

The first target point distance may be the distance between the three-dimensional positions of the present position and the operation target point, or may be a distance including the distance between the three-dimensional positions thereof and the distance between the postures of the reference axis thereat. The first threshold may be, for example, set according to the configurations of the end effector 11 and the robot arm 12 and the like in advance, and stored in the storage unit 20e in advance.

When the present position of the end effector 11 is not any operation target point, the return target point determination unit 23 determines whether or not the present position is located on the operation path of the end effector 11. Being located on the operation path may include being located not only on the operation path but also near the operation path. For example, the return target point determination unit 23 detects a separation distance which is the distance between the present position and the operation path. Specifically, the return target point determination unit 23 detects the separation distance between the present position and a section operation path leading to the destination operation target point. The section operation path is a section operation path included in the information of the destination operation target point for the present position.

When the separation distance is within a second threshold, the return target point determination unit 23 determines that the present position is located on the operation path, and determines detection of the return path. When the separation distance exceeds the second threshold, the return target point determination unit 23 determines that the present position is not located on the operation path, and stops detection of the return path. For example, when the separation distance exceeds the second threshold, there may be an obstacle on the detected return path, so that detection of the return path is stopped. In this case, the return target point determination unit 23 may notify the user of the robot system 1 to inspect an area around the end effector 11, via the presentation device 50 or the like. The separation distance may be the distance between the three-dimensional position of the present position and the three-dimensional position of the operation path. The second threshold may be, for example, set according to the work environment of the robot 10 and the like in advance, and stored in the storage unit 20e in advance.

When detection of the return path is determined, the return target point determination unit 23 determines a first return target point to which the end effector 11 is first returned from the present position. The return target point determination unit 23 determines the operation target point already reached immediately before the present position, or the operation target point having a distance closest to the present position, among the information of each operation target point already reached by the end effector 11 before the present position, as the first return target point. At this time, the return target point determination unit 23 acquires the information of the destination operation target point at the present position. For example, the return target point determination unit 23 acquires information of an (i+1)th operation target point (i is a natural number) as the destination operation target point.

When the operation target point already reached immediately before the present position is determined as the first return target point, the return target point determination unit 23 determines an ith operation target point already reached immediately before the (i+1)th operation target point, as the first return target point.

When the operation target point having a distance closest to the present position is determined as the first return target point, the return target point determination unit 23 determines the operation target point having a distance closest to the present position among the first operation target point to the ith operation target point, as the first return target point. In the present embodiment, the distances between the present position and the first to ith operation target points each include the distance between the three-dimensional positions thereof and the distance between postures thereat. As described above, the positions of the operation target points and the end effector 11 each include the Xw axis element "xw", the Yw axis element "yw", the Zw axis element "zw", and the Euler angle elements "Ow", "Aw", and "Tw" which are represented in the world coordinate system. The distance between the three-dimensional positions is a distance represented by using the Xw axis element "xw", the Yw axis element "yw", and the Zw axis element "zw", and the distance between the postures is a distance represented by using the Euler angle elements "Ow", "Aw", and "Tw". For example, the distances between the present position and the first to ith operation target points may each include only the distance between the three-dimensional positions thereof.

When the distance between two operation target points is equal to or less than a third threshold, the return target point determination unit 23 regards the positions of the two operation target points as being the same. The distance between the two operation target points may a distance between the three-dimensional positions of the two operation target points, or may be a distance including the distance between the three-dimensional positions thereof and the distance between the postures of the reference axis thereat. The third threshold may be, for example, set according to the configurations of the end effector 11 and the robot arm 12 and the like in advance, and stored in the storage unit 20e in advance. The third threshold may be the same as the first threshold. In addition, information of operation target points whose positions are the same may be stored in the storage unit 20e in advance, and the return target point determination unit 23 may acquire the information from the storage unit 20e. The return target point determination unit 23 may be configured such that even when the distance between two operation target points is equal to or less than the third threshold, the positions of the two operation target points are not regarded as being the same.

Moreover, in the present embodiment, the distance between the present position and each of the first to ith operation target points is the distance connecting the present position and each of the first to ith operation target points along the operation path, but may be the distance of a path directly connecting the present position and each of the first to ith operation target points. For example, the distance between the present position and the ith operation target point along the operation path may be the distance of a path that passes through all the section operation paths between the present position and the ith operation target point, or may be the distance of a path obtained by omitting a part or some of the section operation paths. For example, when operation target points whose positions are the same are included as in the present embodiment, a section operation path between these operation target points may be excluded from the distance detection target. For example, in FIG. 8, the distance of section operation paths between the operation target points OTP4 to OTP6 may be excluded from the distance between the fourth operation target point OTP4 and the present position between the operation target points OTP7 and OTP8.

A selection rule of whether the return target point determination unit 23 selects the operation target point already reached immediately before the present position or the operation target point having a distance closest to the present position, as the first return target point, may be set in advance. The selection rule is not particularly limited. For example, the selection rule may be set for the entirety of the operation path, may be set individually for each section operation path, may be set correspondingly to the position of the end effector 11 on the section operation path, may be set correspondingly to the destination operation target point, or may be set for each operation target point.

When operation target points are detected as candidates for the first return target point, the return target point determination unit 23 determines the earliest reached operation target point as the first return target point. For example, the return target point determination unit 23 determines the operation target point having a smallest reach order number among the detected operation target points, as the first return target point.

Next, the return target point determination unit 23 determines a (k+1)th return target point which is the next return target point to which the end effector 11 is returned from a kth return target point (k is a natural number of 1 or more). The kth return target point and the (k+1)th return target point are operation target points. The return target point determination unit 23 determines the operation target point already reached immediately before the kth return target point, or the operation target point having a distance closest to the kth return target point, among the information of each operation target point already reached by the end effector 11 before the kth return target point, as the (k+1)th return target point. At this time, the return target point determination unit 23 acquires information of a (j+1)th operation target point (j is a natural number smaller than i) corresponding to the kth return target point.

When the operation target point already reached immediately before the (j+1)th operation target point, which is the kth return target point, is determined as the (k+1)th return target point, the return target point determination unit 23 determines a jth operation target point already reached immediately before the (j+1)th operation target point, as the (k+1)th return target point.

When the operation target point having a distance closest to the (j+1)th operation target point corresponding to the kth return target point is determined as the (k+1)th return target point, the return target point determination unit 23 determines the operation target point having a distance closest to the (j+1)th operation target point among the first operation target point to the jth operation target point, as the (k+1)th return target point. In the present embodiment, a second target point distance which is the distance between the (j+1)th operation target point and each of the first to jth operation target points includes the distance between the three-dimensional positions thereof and the distance between postures thereat, but may include only the distance between the three-dimensional positions thereof. In addition, whether the second target point distance includes any of the distance between the three-dimensional positions and the distance between the postures may be set in advance correspondingly to each operation target point.

Also, in the present embodiment, the second target point distance is the distance of a path connecting the (j+1)th operation target point and each of the first to jth operation target points through the operation path, but may be the distance of a path directly connecting the (j+1)th operation target point and each of the first to jth operation target points. Similar to the case of the first return target point, the second target point distance along the operation path can be the distance of a path obtained by omitting a part or some of the section operation paths between two operation target points, but may be the distance of a path passing through all the section operation paths. When the distance between two operation target points is equal to or less than the third threshold, the return target point determination unit 23 regards the positions of the two operation target points as being the same.

Similar to the case of the first return target point, a selection rule of whether the return target point determination unit 23 selects the operation target point already reached immediately before the kth return target point or the operation target point having a distance closest to the kth return target point as the (k+1)th return target point may be set in advance.

In addition, when operation target points are detected as candidates for the (k+1)th return target point, the return target point determination unit 23 determines the earliest reached operation target point as the (k+1)th return target point.

Until the (k+1)th return target point reaches the recording origin, the return target point determination unit 23 repeats the process of detecting the (k+1)th return target point from the kth return target point. Accordingly, all the return target points through which the end effector 11 should pass in order to return the end effector 11 to the recording origin, for example, the first return target point to an (n+1)th return target point (n is a natural number of 1 or more) are detected.

The path calculation unit 24 calculates a return path by using information of all the return target points detected by the return target point determination unit 23. The path calculation unit 24 calculates information for returning the end effector 11 from the present position thereof sequentially through the first return target point to the (n+1)th return target point to the recording origin.

For example, the path calculation unit 24 calculates information for moving the end effector 11 from the kth return target point to the (k+1)th return target point. In this case, the path calculation unit 24 sets the position of the (k+1)th return target point as a target position for the end effector 11. In the present embodiment, the position of the (k+1)th return target point includes a three-dimensional position and a posture.

Furthermore, the path calculation unit 24 sets a path that is reverse to the section operation path included in the information of the (j+1)th operation target point corresponding to the kth return target point, as a target operation path, for the end effector 11, leading to the (k+1)th return target point. For example, the section operation path is a section operation path from the jth operation target point to the (j+1)th operation target point. The path calculation unit 24 determines an interpolation mode which is reverse to the interpolation mode of the (j+1)th operation target point, as an interpolation mode from the kth return target point to the (k+1)th return target point.

Furthermore, the path calculation unit 24 sets the state of the end effector 11 included in the information of the operation target point corresponding to the kth return target point, as a target state for the end effector 11 at the (k+1)th return target point. The path calculation unit 24 determines the tool value of the operation target point corresponding to the kth return target point, as a target tool value for the end effector 11 at the (k+1)th return target point.

Furthermore, the path calculation unit 24 sets the position of the robot 10 included in the information of the operation target point corresponding to the (k+1)th return target point, as a target position for the robot 10. The path calculation unit 24 determines the base value of the operation target point corresponding to the (k+1)th return target point, as a target base value for the robot 10 at the (k+1)th return target point.

Until the (k+1)th return target point reaches the recording origin, the path calculation unit 24 repeats the process of calculating the information for moving the end effector 11 from the kth return target point to the (k+1)th return target point.

In the same manner as above, the path calculation unit 24 also calculates information for moving the end effector 11 from the present position thereof to the first return target point. In this case, the path calculation unit 24 sets the position of the first return target point as a target position for the end effector 11. The path calculation unit 24 sets a path that is reverse to the section operation path included in the information of the destination operation target point of the end effector 11 at the return command reception time, as a target operation path, for the end effector 11, leading to the first return target point. That is, the path calculation unit 24 determines an interpolation mode that is reverse to the interpolation mode of the destination operation target point, as an interpolation mode from the present position to the first return target point.

Furthermore, the path calculation unit 24 sets the state of the end effector 11 included in the information of the destination operation target point at the return command reception time, as a target state for the end effector 11 at the first return target point. That is, the path calculation unit 24 determines the tool value of the destination operation target point as a target tool value at the first return target point. Moreover, the path calculation unit 24 sets the position of the robot 10 included in the information of the operation target point corresponding to the first return target point, as a target position for the robot 10, that is, determines the base value of the operation target point corresponding to the first return target point as a target base value for the robot 10 at the first return target point.

As described above, the path calculation unit 24 calculates the information of the return path which is information for returning the end effector 11 from the present position thereof sequentially through the first return target point to the (n+1)th return target point to the recording origin.

[Operation of Robot System]

Figure 9A:
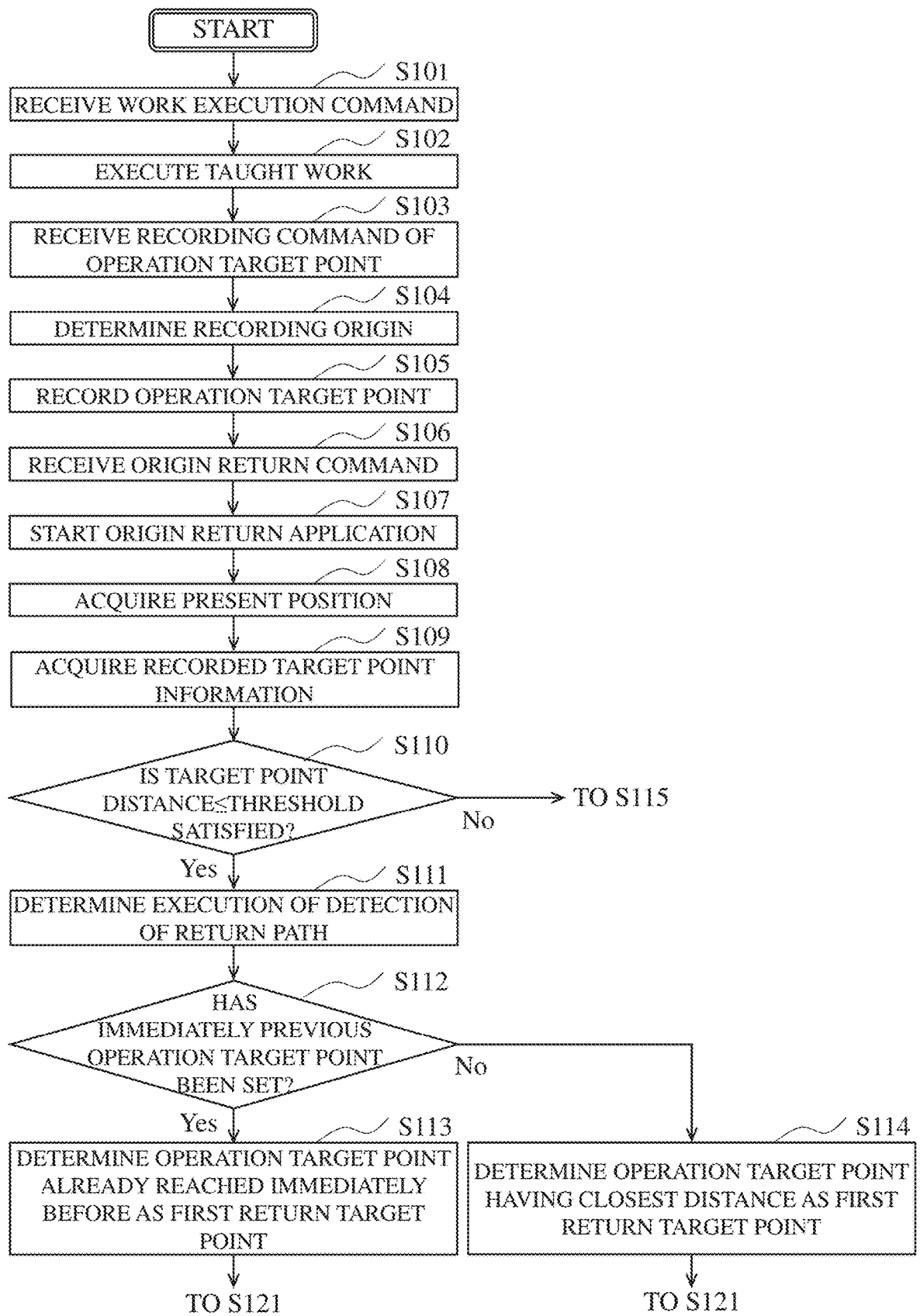
FIG. 9A is a flowchart showing an example of operation of the robot system according to the embodiment.
Figure 9B:
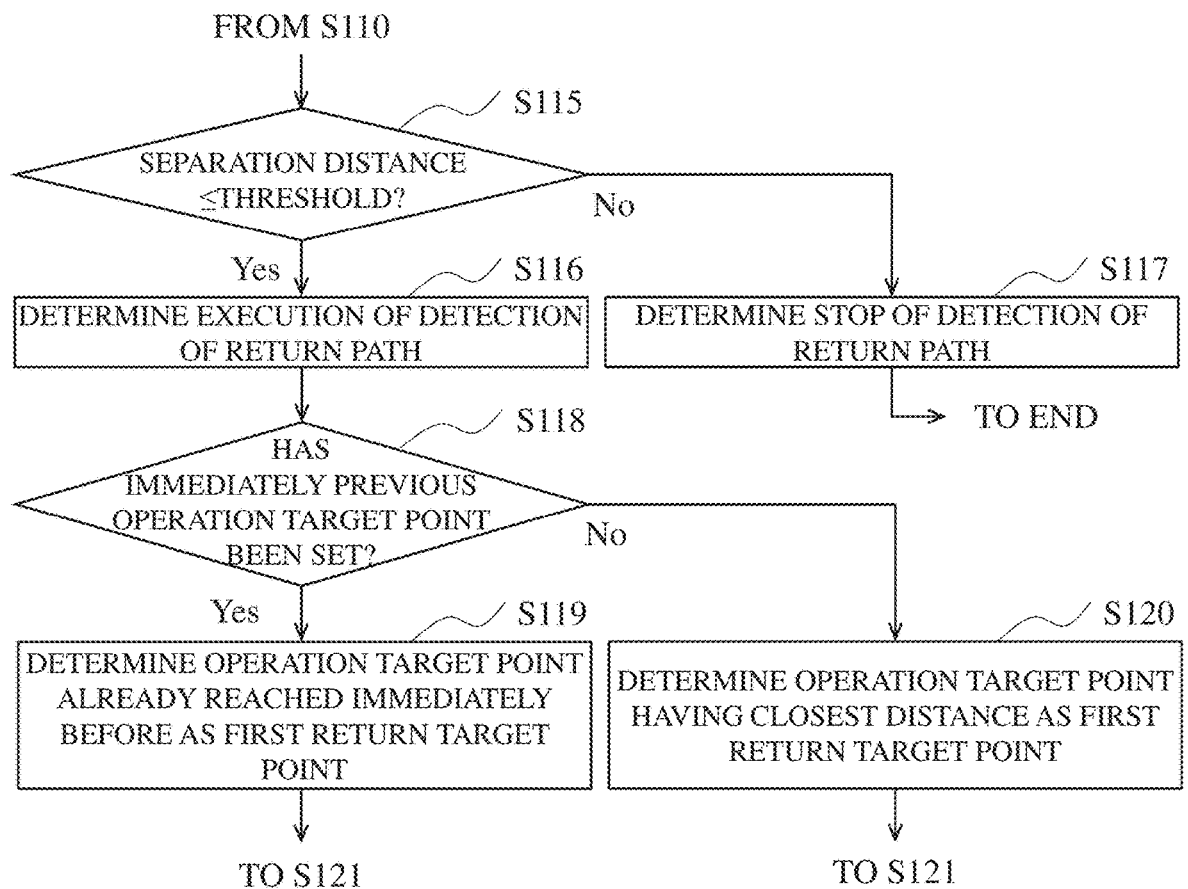
FIG. 9B is a flowchart showing an example of operation of the robot system according to the embodiment.
Figure 9C:
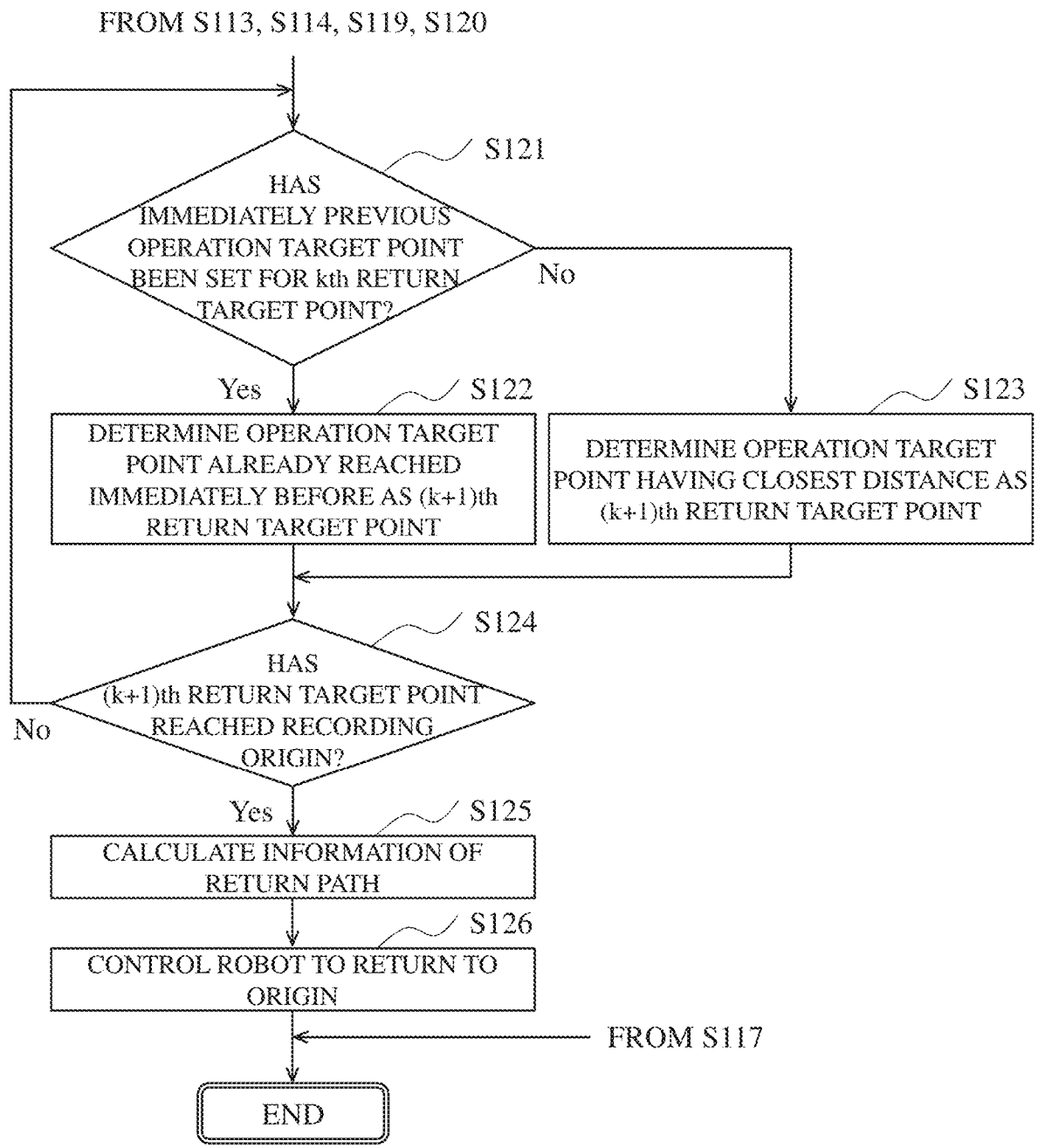
FIG. 9C is a flowchart showing an example of operation of the robot system according to the embodiment.

The operation of the robot system 1 according to the embodiment will be described with FIG. 8 as an example. FIG. 9A to FIG. 9C are each a flowchart showing an example of the operation of the robot system 1 according to the embodiment. As shown in FIG. 9A to FIG. 9C, first, in step S101, the system software 26 of the control device 20 receives a work execution command which is a command to execute taught predetermined work, via input to the input device 40 by the user.

Next, in step S102, the system software 26 searches the teaching information 20eb stored in the storage unit 20e, reads the teaching information of the predetermined work, and causes the robot 10 to execute the work according to the teaching information, that is, taught work. The robot 10 performs the work while moving the end effector 11 sequentially to operation target points.

In step S103, the system software 26 receives a recording command via input to the input device 40 by the user. The recording command is a command to record an operation target point which is a destination each time the end effector 11 moves to the operation target point. Next, in step S104, the system software 26 determines a recording origin which is the starting point of recording. Furthermore, in step S105, the system software 26 records information of each destination operation target point after the recording origin, in the storage unit 20e.

In step S106, the system software 26 receives an origin return command via input to the input device 40 by the user. For example, when an abnormality occurs in the operation of the robot 10, such as the robot 10 stops or the position of the robot 10 is changed largely due to contact with an obstacle or the like, the user inputs an origin return command to the input device 40.

Next, in step S107, the system software 26 starts the origin return application 25. At this time, if the robot 10 is in operation, the system software 26 may stop the robot 10. Furthermore, in step S108, the origin return application 25 acquires the present position of the end effector 11. In the example of FIG. 8, the end effector 11 is positioned between the seventh operation target point OTP7 and the eighth operation target point OTP8.

Furthermore, in step S109, the origin return application 25 searches the recorded target point information 20ec in the storage unit 20e and acquires the information of the recording origin and the information of each operation target point recorded from the recording origin start time to the return command reception time. In the example of FIG. 8, the origin return application 25 acquires the information of the first operation target point OTP1 to the eighth operation target point OTP8.

Next, in step S110, the origin return application 25 detects the first target point distance between each acquired operation target point and the acquired present position of the end effector 11, and determines whether or not there is any operation target point whose first target point distance is equal to or less than the first threshold. When there is such an operation target point (Yes in step S110), the origin return application 25 proceeds to step S111. When there is no such operation target point (No in step S110), the origin return application 25 proceeds to step S115.

In step S111, the origin return application 25 determines that the present position of the end effector 11 is the operation target point, and determines execution of detection of a return path.

Next, in step S112, the origin return application 25 determines whether or not a return target point set for a present position operation target point which is an operation target point for the present position of the end effector 11 is the operation target point already reached immediately before. When the return target point is the operation target point already reached immediately before (Yes in step S112), the origin return application 25 proceeds to step S113. When the return target point is not the operation target point already reached immediately before (No in step S112), the origin return application 25 proceeds to step S114.

In step S113, the origin return application 25 detects information of the operation target point already reached immediately before the present position operation target point, determines this detected operation target point as a first return target point for the end effector 11, and proceeds to step S121.

In step S114, the origin return application 25 detects information of the operation target point having a distance closest to the present position operation target point among the information of the operation target points already reached before the present position operation target point, and determines this detected operation target point as the first return target point. When operation target points are detected, the origin return application 25 determines the operation target point reached earliest by the end effector 11 among the operation target points, as the first return target point. That is, the origin return application 25 determines the operation target point having a smallest reach order number among the operation target points, as the first return target point, and proceeds to step S121.

Also, in step S115, the origin return application 25 determines whether or not the separation distance between the present position of the end effector 11 and the operation path of the end effector 11 is within the second threshold. The origin return application 25 determines the separation distance between the present position and the section operation path leading to the destination operation target point. In the example of FIG. 8, the separation distance between the present position of the end effector 11 and a section operation path between the seventh operation target point OTP7 and the eighth operation target point OTP8 is determined.

When the separation distance is within the second threshold (Yes in step S115), the origin return application 2520 determines execution of detection of the return path and proceeds to step S118 (step S116). When the separation distance exceeds the second threshold (No in step S115), the origin return application 25 determines stop of detection of the return path, and presents a notification or the like prompting the user to inspect an area around the end effector 11, to the user via the presentation device 50 (step S117). In the example of FIG. 8, the separation distance is within the second threshold.

Next, in step S118, the origin return application 25 determines whether or not a return target point set for the destination operation target point for the present position is the operation target point already reached immediately before. When the return target point is the operation target point already reached immediately before (Yes in step S118), the origin return application 25 proceeds to step S119. When the return target point is not the operation target point already reached immediately before (No in step S118), the origin return application 25 proceeds to step S120.

In step S119, the origin return application 25 detects information of the operation target point already reached immediately before the present position, determines this detected operation target point as the first return target point, and proceeds to step S121.

In step S120, the origin return application 25 detects information of the operation target point having a distance closest to the present position among the information of the operation target points already reached by the end effector 11 before the present position, and determines this detected operation target point as the first return target point. When operation target points are detected, the origin return application 25 determines the operation target point reached earliest by the end effector 11 among the operation target points, as the first return target point, and proceeds to step S121. In the example of FIG. 8, the origin return application 25 determines the seventh operation target point OTP7 having a distance closest to the present position, as a first return target point.

Next, in step S121, the origin return application 25 determines whether or not a return target point set for the operation target point corresponding to a kth return target point (k is a natural number of 1 or more) is the operation target point already reached immediately before. When the return target point is the operation target point already reached immediately before (Yes in step S121), the origin return application 25 proceeds to step S122. When the return target point is not the operation target point already reached immediately before (No in step S121), the origin return application 25 proceeds to step S123.

In step S122, the origin return application 25 detects information of the operation target point already reached immediately before the kth return target point, determines this detected operation target point as a (k+1)th return target point, and proceeds to step S124.

In step S123, the origin return application 25 detects information of the operation target point having a distance closest to the kth return target point among the information of the operation target points already reached before the kth return target point, and determines this detected operation target point as a (k+1)th return target point. When operation target points are detected, the origin return application 25 determines the operation target point reached earliest by the end effector 11 among the operation target points, as the (k+1)th return target point, and proceeds to step S124. In the example of FIG. 8, for example, the origin return application 25 determines the fourth operation target point OTP4 out of the fourth operation target point OTP4 and the sixth operation target point OTP6 having a distance closest to the seventh operation target point OTP7 which is the first return target point, as a second return target point.

In step S124, the origin return application 25 determines whether or not the (k+1)th return target point has reached the recording origin. Reaching the recording origin includes the case that the (k+1)th return target point coincides with the recording origin, the case that a section return path between the (k+1)th return target point and the kth return target point passes through the recording origin, the case that the (k+1)th return target point coincides with an operation target point through which the end effector 11 has passed before the recording origin, etc. When the recording origin has already been reached (Yes in step S124), the origin return application 25 proceeds to step S125. When the recording origin has not been reached yet (No in step S124), the origin return application 25 proceeds to step S121 in order to detect the next return target point.

In step S125, the origin return application 25 calculates information of a return path which is information for returning the end effector 11 from the present position thereof through all the return target points to the recording origin.

Next, in step S126, the system software 26 returns the robot 10 to the origin by controlling the robot 10 according to the information of the return path.

As described above, the control device 20 causes the robot 10 to automatically return to the origin, by executing the processes in steps S101 to S126 while repeating the processes in steps S121 to S124 by the origin return application 25.

The origin return application 25 may be configured not to include the process in step S110 and not to execute the determination as to whether or not the present position of the end effector 11 is an operation target point. In this case, the origin return application 25 may be configured to execute the process in step S115 after step S109 without executing detection and determination of a first target point distance.

Other Embodiments

Although the examples of the embodiment of the present disclosure have been described above, the present disclosure is not limited to the above embodiment. That is, various modifications and improvements may be made within the scope of the present disclosure. For example, modes in which various modifications are applied to the embodiment and modes constructed by combining the components in different embodiments are also included within the scope of the present disclosure.

For example, the control device 20 according to the embodiment detects all return target points and all section return paths, determines the entire return path, and then operates the robot 10 to return the end effector 11 to the origin, but is not limited thereto. For example, the control device 20 may control the robot 10 such that each time a return target point is detected, the end effector 11 is moved along a section return path leading to this return target point.

Moreover, the technology of the present disclosure may be a control method. For example, a control method according to an aspect of the present disclosure is a control method for a robot that performs operation of moving an end effector sequentially to operation target points on an operation path, the control method including: recording information of the operation target point that is a destination, each time the end effector moves to the operation target point; acquiring a present position of the end effector upon receiving an origin return command to return the end effector to an origin of the operation path; detecting information of a first return target point that is the operation target point already reached immediately before the present position or the operation target point having a distance closest to the present position among information of the operation target points already reached by the end effector before the present position, as information of a point on a return path for returning the end effector to the origin; detecting information of a (k+1)th return target point that is the operation target point already reached immediately before a kth return target point or the operation target point having a distance closest to the kth return target point among information of the operation target points already reached by the end effector before the return target point, as information of a point on the return path, wherein k is a natural number from 1 to n and n is a natural number of 1 or more; repeating detection of the information of the (k+1)th return target point to detect information of a second return target point to an (n+1)th return target point; determining the return path passing through the first return target point to the (n+1)th return target point in this order and returning to the origin; and moving the end effector along the return path. Such a control method may be realized by a circuit such as a CPU or LSI, an IC card, a single module, or the like.

Moreover, the technology of the present disclosure may be a program, or may be a non-transitory computer-readable recording medium having the program recorded therein. The recording medium is not particularly limited as long as the recording medium has a configuration capable of recording a program, and, for example, may be a medium for optically, electrically, or magnetically recording information, such as a CD-ROM (Read only memory), a DVD-ROM, a BD-ROM, a flexible disk, and a magneto-optical disk, or may be a medium such as a hard disk and a semiconductor memory for electrically recording information, such as a ROM, a flash memory, a memory card.

For example, a program according to an aspect of the present disclosure is a program executed by a computer, the program causing the computer to: in a process in which a robot moves an end effector sequentially to operation target points on an operation path, record information of the operation target point that is a destination, each time the end effector moves to the operation target point; acquire a present position of the end effector upon receiving an origin return command to return the end effector to an origin of the operation target points; detect information of a first return target point that is the operation target point already reached immediately before the present position or the operation target point having a distance closest to the present position among information of the operation target points already reached by the end effector before the present position, as information of a point on a return path for returning the end effector to the origin; detect information of a (k+1)th return target point that is the operation target point already reached immediately before a kth return target point or the operation target point having a distance closest to the kth return target point among information of the operation target points already reached by the end effector before the kth return target point, as information of a point on the return path, wherein k is a natural number from 1 to n and n is a natural number of 1 or more; repeat detection of the information of the (k+1)th return target point to detect information of a second return target point to an (n+1)th return target point; and determine the return path passing through the first return target point to the (n+1)th return target point in this order and returning to the origin. For example, the recording medium according to the aspect of the present disclosure has the above program recorded therein. In addition, it is needless to say that the above program can be distributed via a transmission medium such as the Internet.

Moreover, the numbers such as the ordinal number and the quantities used above are all examples for specifically describing the technology of the present disclosure, and the present disclosure is not limited to the exemplified numbers. In addition, the connection relationship between the components is exemplified for specifically describing the technology of the present disclosure, and the connection relationship that realizes the function of the present disclosure is not limited thereto.

Moreover, the division of blocks in the functional block diagram is an example, and blocks may be realized as one block, one block may be divided into blocks, and/or some functions may be transferred to another block. In addition, the functions of blocks having similar functions may be processed by single hardware or software in parallel or in a time division manner.

The invention claimed is:
1. A control method for a robot that performs operation of moving an end effector sequentially to operation target points on an operation path, the control method comprising:
　recording information of the operation target point that is a destination, each time the end effector moves to the operation target point;
　acquiring a present position of the end effector upon receiving an origin return command to return the end effector to an origin of the operation path;
　detecting information of a first return target point that is the operation target point already reached immediately before the present position or the operation target point having a distance closest to the present position among information of the operation target points already reached by the end effector before the present position, as information of a point on a return path for returning the end effector to the origin;
　detecting information of a (k+1)th return target point that is the operation target point already reached immediately before a kth return target point or the operation target point having a distance closest to the kth return target point among information of the operation target points already reached by the end effector before the kth return target point, as information of a point on the return path, wherein k is a natural number from 1 to n and n is a natural number of 1 or more:
　repeating detection of the information of the (k+1)th return target point to detect information of a second return target point to an (n+1)th return target point;
　determining the return path passing through the first return target point to the (n+1)th return target point in this order and returning to the origin; and
　moving the end effector along the return path.

2. The control method according to claim 1, including:
determining the earliest reached operation target point as the return target point when detecting the operation target points as candidates for the return target point.

3. The control method according to claim 1, including:
detecting a target point distance that is a distance between the recorded operation target point and the present position; and
when the target point distance is within a first threshold, regarding the present position as being located at the operation target point whose target point distance is within the first threshold.

4. The control method according to claim 1, including:
detecting a separation distance that is a distance between the present position and the operation path;
executing detection of the return target point when the separation distance is within a second threshold; and
stopping detection of the return target point when the separation distance exceeds the second threshold.

5. The control method according to claim 1, wherein a distance between the present position or the return target point and the operation target point is a distance along the operation path.

6. The control method according to claim 1, including:
regarding positions of the two operation target points as being the same when a distance between the two operation target points is equal to or less than a third threshold.

7. The control method according to claim 1, wherein the information of the operation target point includes information of a position of the operation target point, a section operation path that is a path from the immediately previous operation target point to the operation target point, a state of the end effector, and a position of the robot.

8. The control method according to claim 7, wherein the position of the operation target point includes a three-dimensional position of the operation target point and a posture of a reference axis at the operation target point.

9. The control method according to claim 8, wherein the distance between the present position or the return target point and the operation target point includes a distance between a three-dimensional position of the present position or the return target point and the three-dimensional position of the operation target point and a distance between a posture of the reference axis at the present position or the return target point and the posture of the reference axis at the operation target point.

10. The control method according to claim 7, moving the end effector from the kth return target point to the (k+1)th return target point, including:
determining a position of the (k+1)th return target point as a target position for the end effector;
determining a path that is reverse to the section operation path included in information of the kth return target point as a target operation path for the end effector;
determining the state of the end effector included in the information of the kth return target point as a target state for the end effector; and
determining the position of the robot included in the information of the (k+1)th return target point as a target position for the robot.

11. The control method according to claim 7, when moving the end effector from the present position thereof to the first return target point, including:
determining a position of the first return target point as a target position for the end effector;
determining a path that is reverse to the section operation path included in information of a destination operation target point that is the operation target point that is the destination for the present position as a target operation path for the end effector;
determining the state of the end effector included in the information of the destination operation target point as a target state for the end effector; and
determining the position of the robot included in information of the first return target point as a target position for the robot.

12. The control method according to claim 1, wherein the operation target point is a target point of the operation taught to the robot in a process of teaching the operation to the robot.

13. A controller that executes the control method according to claim 1.

14. A robot system comprising:
the controller according to claim 13; and
the robot, wherein
the controller controls operation of the robot.

15. A non-transitory recording medium having recorded therein a program executed by a computer, the program causing the computer to:
in a process in which a robot moves an end effector sequentially to operation target points on an operation path, record information of the operation target point that is a destination, each time the end effector moves to the operation target point;
acquire a present position of the end effector upon receiving an origin return command to return the end effector to an origin of the operation target points;
detect information of a first return target point that is the operation target point already reached immediately before the present position or the operation target point having a distance closest to the present position among information of the operation target points already reached by the end effector before the present position, as information of a point on a return path for returning the end effector to the origin;
detect information of a (k+1)th return target point that is the operation target point already reached immediately before a kth return target point or the operation target point having a distance closest to the kth return target point among information of the operation target points already reached by the end effector before the kth return target point, as information of a point on the return path, wherein k is a natural number from 1 to n and n is a natural number of 1 or more;
repeat detection of the information of the (k+1)th return target point to detect information of a second return target point to an (n+1)th return target point; and
determine the return path passing through the first return target point to the (n+1)th return target point in this order and returning to the origin.

16. The non-transitory recording medium according to claim 15, wherein the program is an application program that runs on a system program of a controller that controls operation of the robot.

17. The non-transitory recording medium according to claim 16, wherein the application program is allowed to run when the application program is installed and incorporated in the system program.

18. The non-transitory recording medium according claim 15, wherein the program causes the computer to:
   determine the earliest reached operation target point as the return target point when the operation target points are detected as candidates for the return target point.

19. The non-transitory recording medium according to claim 15, wherein the program causes the computer to:
   detect a target point distance that is a distance between the recorded operation target point and the present position; and
   when the target point distance is within a first threshold, regard the present position as being located at the operation target point whose target point distance is within the first threshold.

20. The non-transitory recording medium according to claim 15, wherein the program causes the computer to:
   detect a separation distance that is a distance between the present position and the operation path;
   execute detection of the return target point when the separation distance is within a second threshold; and
   stop detection of the return target point when e separation distance exceeds the second threshold.

21. The non-transitory recording medium according to claim 15, wherein a distance between the present position or the return target point and the operation target point is a distance along the operation path.

22. The non-transitory recording medium according to claim 15, wherein the program causes the computer to:
   regard positions of the two operation target points as being the same when a distance between the two operation target points is equal to or less than a third threshold.

23. The non-transitory recording medium according to claim 15, wherein the information of the operation target point includes information of a position of the operation target point, a section operation path that is a path from the immediately previous operation target point to the operation target point, a state of the end effector, and a position of the robot.

24. The non-transitory recording medium according to claim 23, wherein the position of the operation target point includes a three-dimensional position of the operation target point and a posture of a reference axis at the operation target point.

25. The non-transitory recording medium according to claim 24, wherein the distance between the present position or the return target point and the operation target point includes a distance between a three-dimensional position of the present position or the return target point and the three-dimensional position of the operation target point and a distance between a posture of the reference axis at the present position or the return target point and the posture of the reference axis at the operation target point.

26. The non-transitory recording medium according to claim 23, wherein, in a section return path from the kth return target point to the (k+1)th return target point in the return path, the program causes the computer to:
   determine a position of the (k+1)th return target point as a target position for the end effector;
   determine a path that is reverse to the section operation path included in information of the kth return target point as a target operation path for the end effector;
   determine the state of the end effector included in the information of the kth return target point as a target state for the end effector; and
   determine the position of the robot included in the information of the (k+1)th return target point as a target position for the robot.

27. The non-transitory recording medium according to claim 23, wherein, in a section return path from the present position to the first return target point in the return path, the program causes the computer to:
   determine a position of the first return target point as a target position for the end effector;
   determine a path that is reverse to the section operation path included in information of a destination operation target point that is the operation target point that is the destination for the present position as a target operation path for the end effector;
   determine the state of the end effector included in the information of the destination operation target point as a target state for the end effector; and
   determine the position of the robot included in information of the first return target point as a target position for the robot.

28. The non-transitory recording medium according to claim 15, wherein the operation target point is a target point of the operation taught to the robot in a process of teaching the operation to the robot.

* * * * *